United States Patent [19]

Mobley

[11] 4,035,805
[45] July 12, 1977

[54] SATELLITE TRACKING ANTENNA SYSTEM

[75] Inventor: Joseph Graham Mobley, Tucker, Ga.

[73] Assignee: Scientific-Atlanta, Inc., Atlanta, Ga.

[21] Appl. No.: 598,492

[22] Filed: July 23, 1975

[51] Int. Cl.² .......................................... G01S 5/02
[52] U.S. Cl. ............................ 343/117 R; 318/649; 343/100 ST
[58] Field of Search ................ 343/117 R, 100 ST; 244/3.2; 318/649

[56] References Cited

U.S. PATENT DOCUMENTS

| 3,305,868 | 2/1967 | Oki et al. | 343/117 R |
|---|---|---|---|
| 3,746,281 | 7/1973 | Stripling | 244/3.2 |
| 3,842,420 | 10/1974 | Rabow | 343/117 R |

Primary Examiner—Maynard R. Wilbur
Assistant Examiner—T. M. Blum
Attorney, Agent, or Firm—Martin Lukacher

[57] ABSTRACT

A satellite tracking antenna system for use on board ship as part of a maritime communications satellite terminal is disclosed. The system has a directional antenna which is continually trained in the direction of the satellite so as to receive signals therefrom and transmit thereto in spite of the continual rolling, pitching and turning movement of the ship as it travels along its course, even in heavy seas. The system includes a platform which is adapted to be mounted at the head of the mast of the ship. A servo control unit receives position and angular rate signals from roll and pitch sensors mounted on the platform, and serves to drive stepper motors through drive units therefor which counteract pitch and roll without the need for gyroscopic stabilization means and without requiring tachometers or other feedback control in the drive units so that the platform always remains level regardless of the pitching and rolling of the ship. A heading input unit receives synchro information from the ship's gyrocompass or from its synchro or step repeaters by way of a gyrocompass converter which translates this information into digital form. The heading input unit also receives azimuth information regarding the position of the satellite as well as elevation data, also regarding the position of the satellite. Azimuth and elevation control servos which may include stepper motors and drive units similar to those used in the pitch and roll servos, are operated by control signals from the heading input unit train the antenna in azimuth and elevation so that it points in the direction of the satellite. Yawing or turning is counteracted by the heading input unit which modifies the azimuth control signal in accordance with the data as to the ship's heading from the gyrocompass converter. The direction of the pointing of the antenna, to accommodate slow changes in latitude and longitude as the ship moves along its course which causes a change in satellite position relative to the ship, is accommodated by either changing the elevation and azimuth data provided to the heading input unit or by means of an automatic satellite position update unit which changes the heading input data to the azimuth and elevation servos in accordance with changes in the strength of the signal received by the antenna from the satellite.

26 Claims, 14 Drawing Figures

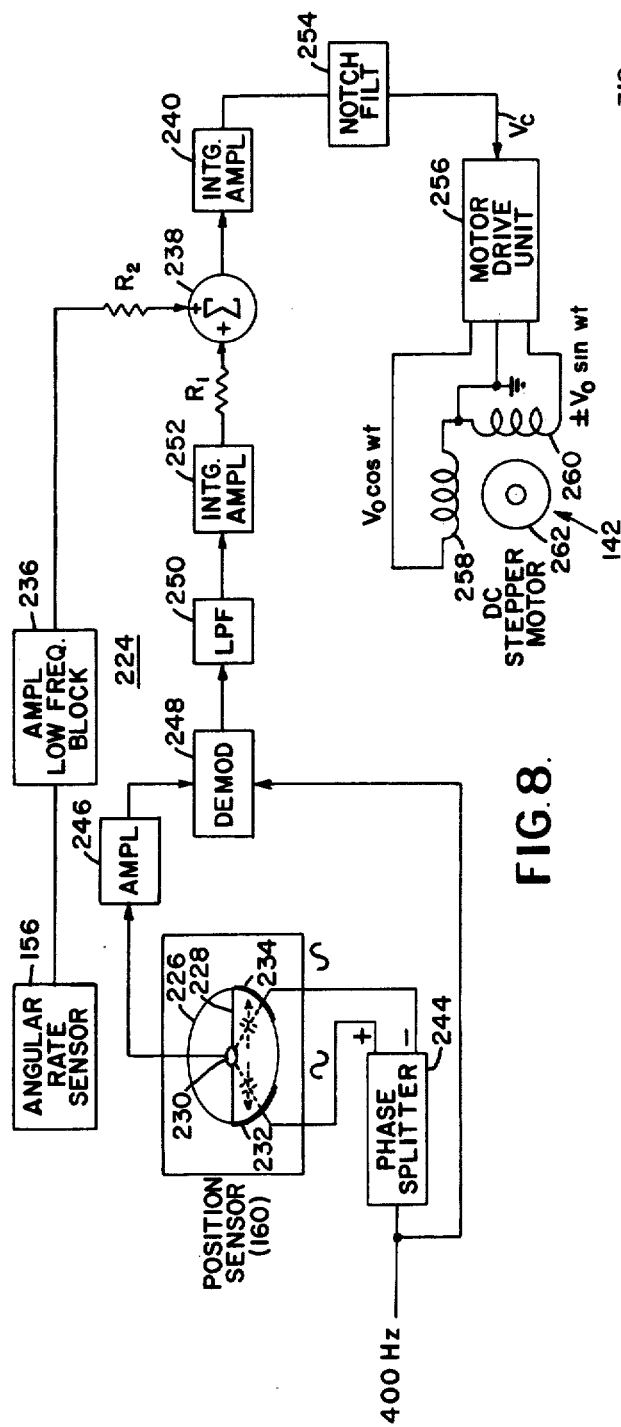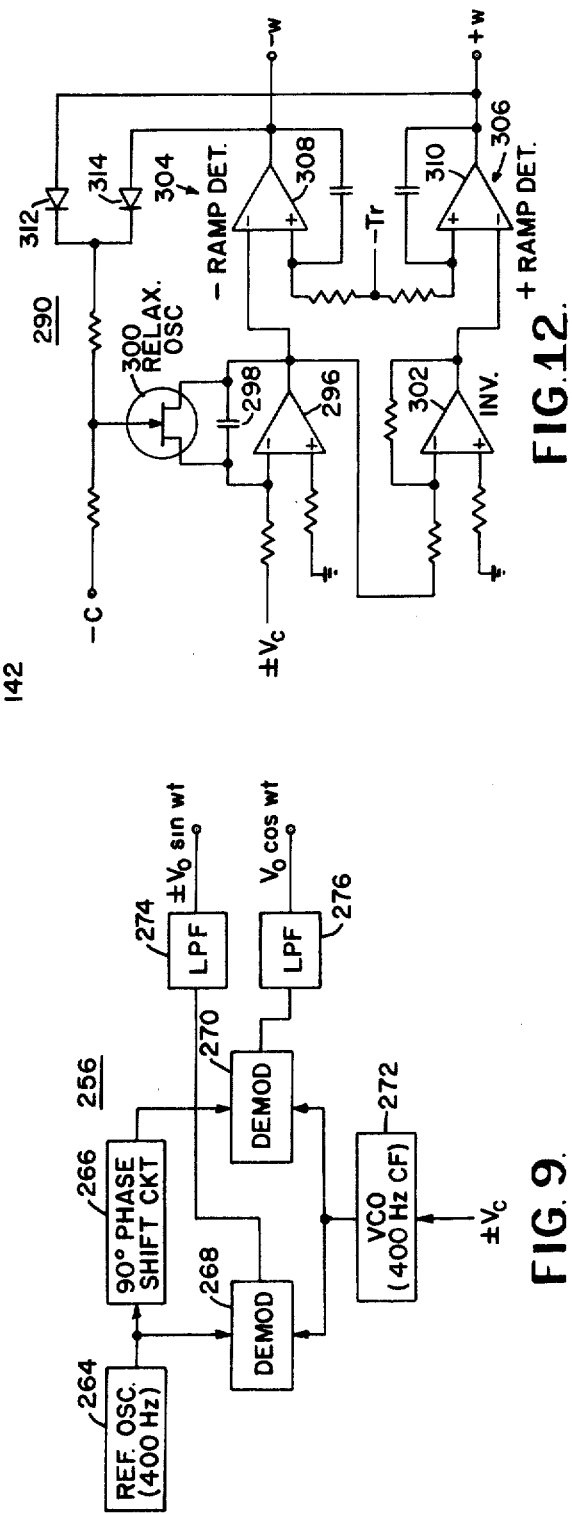

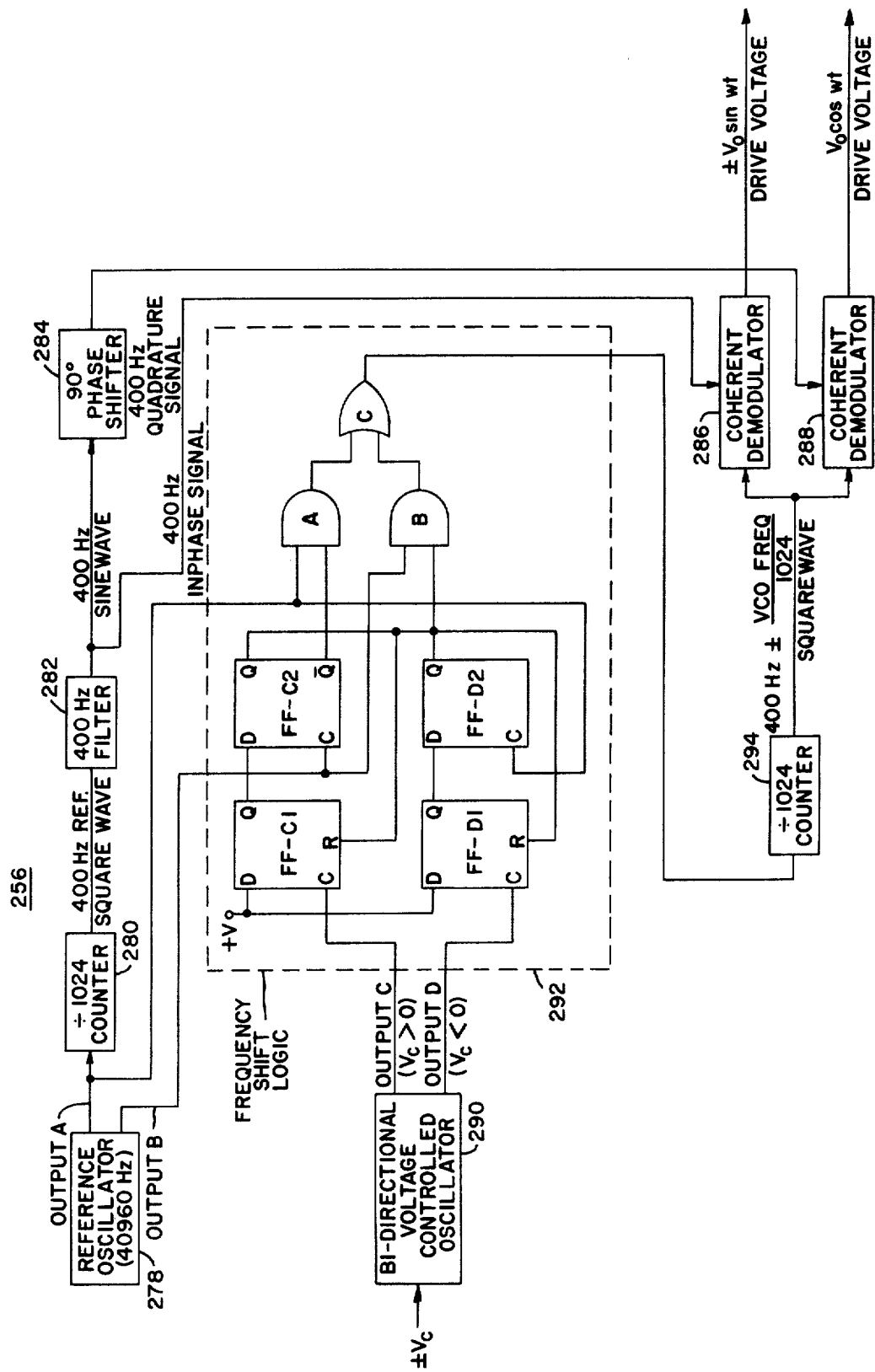

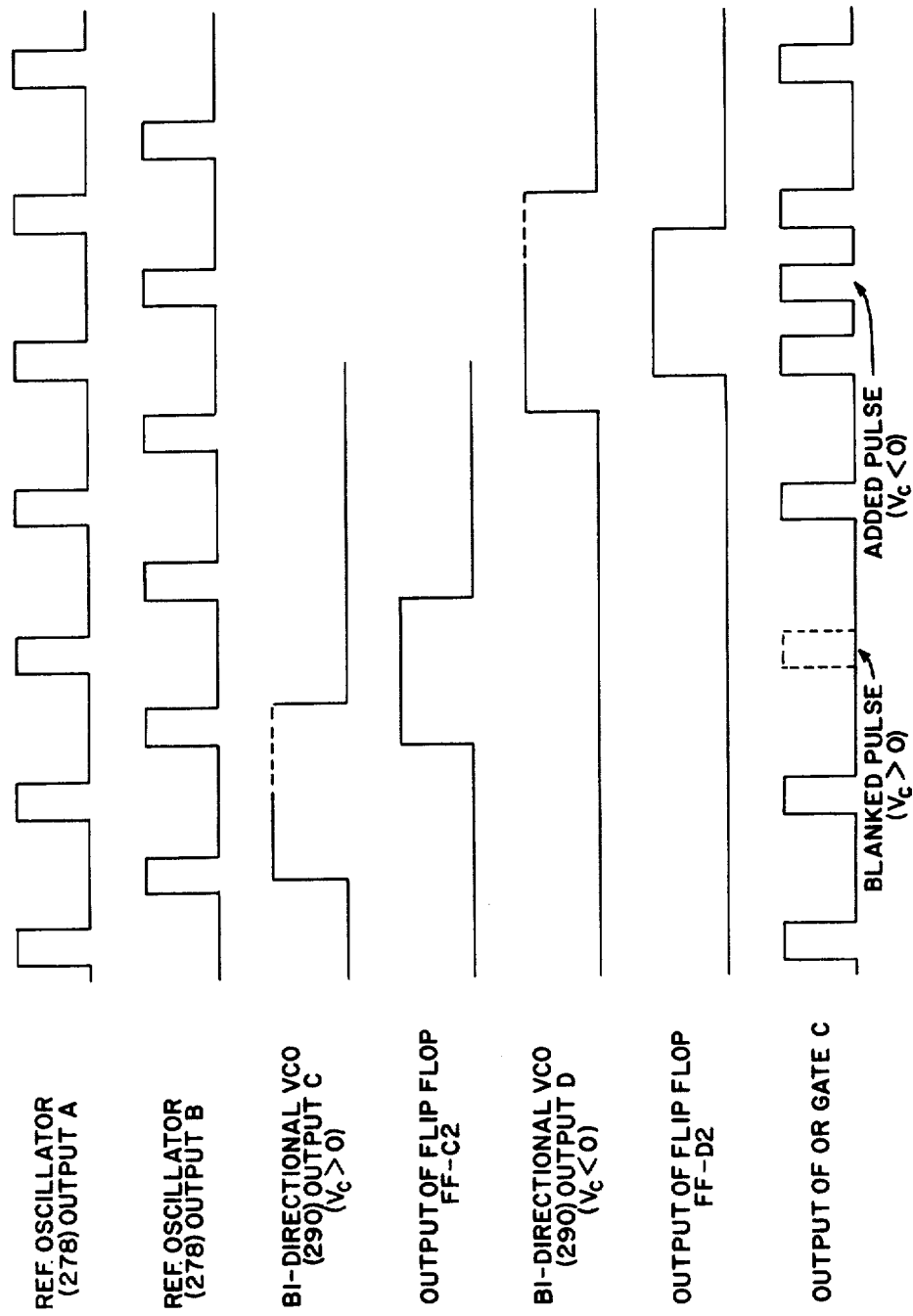

SATELLITE TRACKING ANTENNA SYSTEM

The present invention relates to satellite tracking antenna systems, and particularly to a maritime satellite tracking antenna system for providing ship-to-shore communications via satellite.

The invention is especially adapted for use in a stabilized shipboard antenna system for tracking satellites in spite of motions (pitch, roll and turn or yaw) of a ship at sea. Aspects of the invention are also applicable to servo control and digital data handling systems. integration interval Satellite antenna tracking systems have for the most part been designed for land based application. Autotracking systems responsive to the signal received by the antenna have been used to provide control signals for pointing the antenna towards the satellite. Ships at sea experience pitch, roll, turning and combinations of these motions. Maintaining the antenna of a ship-borne satellite tracker pointed toward the satellite under conditions of ship's motion through the use of autotrack techniques are not entirely practical due to the complexity of the electronic and electromechanical system for training the antenna incidental thereto, and also because interruption of the signal received from the satellite would necessarily introduce errors and the need for repointing procedures until the satellite signal was reacquired and locked onto.

In maritime applications, interruption of the signal can occur frequently, since the signal path to the antenna may be blocked by part of the ship's super structure during rolling, pitching and turns, or by hills, mountains or buildings when the ship is in waters close to the shore. In addition, signal perturbation as caused by reflections from the ship, surrounding objects and from the sea's surface may also result in a loss of lock and need for complex procedures in reacquiring the satellite signal. Reference may be had to an article by Nicholas A. Raumann entitled "Computer Controlled Antenna System", appearing in *Technology Accomplishments*, 1970, published by the NASA-Goddard Space Flight Center, 1972 (NASA SP-295, available from National Technical Information Service, Springfield, Va., 22161), for further information respecting autotracking techniques for ground based satellite tracking antennas and illustrating the need for complex computer operated control systems for acquiring and reacquiring lock-in autotracked satellite antenna systems.

Inasmuch as a shipborad satellite terminal, and particularly the antenna training portion thereof which must be mounted above deck, is subject ot severe environment at sea, simplicity of design, minimization of movable parts, and ease of maintenance are especially needed in a practical shipboard terminal. Also desirable is that the tracking system be operational without attention for long periods of time, preferably over an entire voyage. To this end, it is desirable to enable the antenna to be pointed at the satellite at the start of the voyage, and then automatically change its position as the ship moves under the satellite and the satellite's the coordinates vary with respect to the ship's coordinates. In many applications some manual repointing may be suitable, such as inputting new coordinate data to reposition the antenna, say once a day. Then the communications officer can devote his time to sending and receiving messages rather than to the maintenance and operation of the antenna tracking system.

Control systems of various types have been proposed which are responsive to changes in position of a moving body, such as aircraft (see U.S. Pat. Nos. 2,910,639; 3,052,832; 3,286,245; and 3,736,880). It has also been proposed to stabilize a camera and an antenna by mounting on a stable platform (see U.S. Pat. Nos. 3,094,054 and 3,358,285). The stabilization techniques which have been proposed have involved the use of gyroscope and similar accelerometers which, are not only unreliable in long term operation under adverse conditions as aboard ship, but also are subject to a vibration, shock and other perturbations which often accompany shipboard operation.

The heading of the ship whether due to changes in course, or to yawing as the ship moves through the sea, affects the direction in which the antenna must be pointed to track the satellite. Ships are often equipped with gyrocompasses or other compass means which indicate their heading. The angular position information from these compasses is not in a form where it can be used to counteract the effect of such turning or yawing motions on the position of the satellite tracking antenna. It is a feature of this invention to provide the means necessary to convert the angular compass heading information, whether from a synchro or a step type repeater, into signals, preferably directly in digital format, which may be used to correct for such heading errors which may be introduced by turning or yawing of the ship.

While various motor control systems have been suggested for servo system use, many require direct current motors. Such motors may result in hazards aboard ships due to sparks at their slip rings. Other servo motors require feedback control by way of tachometers or, alternatively, complex circuitry for stabilization (see for example, U.S. Pat. Nos. 3,553,555; 3,577,057; 3,609,488; 3,700,987; and 3,760,248). It is desirable to provide a simplified servo control motor and associated apparatus for use in the satellite antenna tracking system; particularly since such motors must be mounted above decks in the antenna structure and subjected to serve environmental effects. Other motors which have been used recently for control purposes are known as stepper motors. These motors are normally designed to be driven by pulse trains (see U.S Pat. No. 3,355,644) and are subject to mechanical resonances and irregularity of motion as they move incrementally step by step. Special circuits are sometimes used in an attempt to reduce such irregular motion which may manifest itself as vibration and ringing effects (see U.S. Pat. No. 3,826,966). In accordance with the feature of this invention, the use of stepper motors in a manner which eliminates vibration, irregular motion and ringing or other setting time effects is provided, and enables such motors to be used as servo motors in shipborne satellite tracking apparatus.

Accordingly, it is the object of the present invention to provide an improved satellite antenna tracking system wherein the above described difficulties and disadvantages have been substantially eliminated.

It is another object of the present invention to provide an improved system for stabilizing a shipboard antenna so that it may continuously track a satellite in spite of motion of the ship at sea (e.g., pitching, rolling, yawing and/or turning).

It is a further object of the present invention to provide an improved satellite tracking antenna system which is reliable in operation and may be used under severe environmental conditions as on board a ship at sea.

It is a still further object of the present invention to provide an improved servo system for maintaining the position of an antenna with respect to a desired orientation, notwithstanding complex motions, such as the rolling, pitching, turning motion of a ship at sea.

It is a still further object of the present invention to provide an improved shipboard satellite tracking antenna system which makes use of on-board available equipment, particularly the ship's gyrocompass, in order to provide data for correcting the position of the antenna for turning and yawing motion of the ship.

it is a still further object of the present invention to provide an improved satellite tracking antenna system which may be pointed toward the satellite at the start of a voyage and be automatically updated for changes in the coordinates of the satellite with respect to the coordinates of the ship, thereby enabling the system to be unattended for long periods of time, say even an entire voyage.

It is a still further object of the present invention to provide an improved motor drive system suitable for rotating a satellite tracking antenna wherein brushes, gears, tachometers, brakes, as have heretofore been used, are eliminated.

It is a still further object of the present invention to provide an improved servo drive system employing stepper motors.

It is a still further object of the present invention to provide an improved frequency control system for two phase motors such as the stepper motors and the like, which eliminates vibration, settling time and other irregular motion effects which have conventionally accompanied stepper motor action.

It is a still further object of the present invention to provide an improved system for converting angular information represented by phase related voltages of synchro or step repeater devices into digital data signals, which may be used for controlling the orientation of an antenna.

Briefly described, the invention may be embodied in a satellite tracking antenna system wherein an antenna is mounted for rotation on a plurality of axes. Two of these axes are the pitch and roll axes, say of a ship, which carries a satellite communications terminal of which the antenna tracking system forms a part. The antenna is tilted about the pitch and roll axes by a servo control system so that the antenna maintains a stable level position regardless of the rolling and pitching motion of the ship. The antenna is also mounted for rotation, in elevation and in azimuth. Heading input means, responsive to data signals representing the position of the satellite in elevation and in azimuth, provides control signals for turning the antenna about the azimuth and elevation axes. The data respecting the heading of the ship, whether due to turns or yawing, are also applied to the heading input means so that the effect of turning and yawing of the ship on the position of the antenna in azimuth may be counteracted. For providing the actual ship's heading, a snychro or step repeater signal from the ship's gyrocompass or other heading indicating system may be applied to a converter which translates the signal into pulses which indicate changes in the heading of the ship, in either plus one degree or minus one degree steps. These pulses are utilized to change a digital number representing an initial heading of the ship so as to provide, in a register or other device which stores the number, a number corresponding to the actual ships heading.

Briefly described, the servo drive systems which may be used to drive the antenna about its pitch, roll, elevation and azimuth axes utilize conventional stepper motors (e.g., two phase motors which are designed for 200 or more steps per revolution). Sinusoidal voltages in quadrature phase relationship are generated. The frequency and relative polarity of the voltages is changed in accordance with the magnitude and polarity of a control voltage so as to control the speed and direction of rotation of the motor. The motor moves smoothly and no tachometers, brakes, rate feedback loops or the like are required to provide smooth motion in response to the servo drive control signals.

The pitch and roll axes may be controlled by separate pitch and roll servo control systems. Each of these systems utilizes a sensor arrangement wherein gyroscopes are entirely eliminated. This sensor arrangement is provided by a position level sensor and by another sensor which produces a rate or velocity output relative to inertial space. Both of these devices are desirably solid-state sensors, where the output of these sensors provide a position error signal and a rate error signal which are combined in a manner whereby changes in the position error signal have a much smaller effect than changes in the rate error signal. A combined error signal, containing both position and rate information, is applied as a control signal to a servo motor drive system, preferably a frequency controlled stepper motor system of the type above described. These motors, one for the pitch axis and the other for the roll axis, maintain the antenna stable with respect to these axes, in spite of pitching and rolling of the ship.

The foregoing and other objects and advantages of the present invention will become more apparent from the reading of the following description of the preferred embodiment of the invention which is set forth hereinafter and is shown in the accompanying drawings in which.

Figure 3:
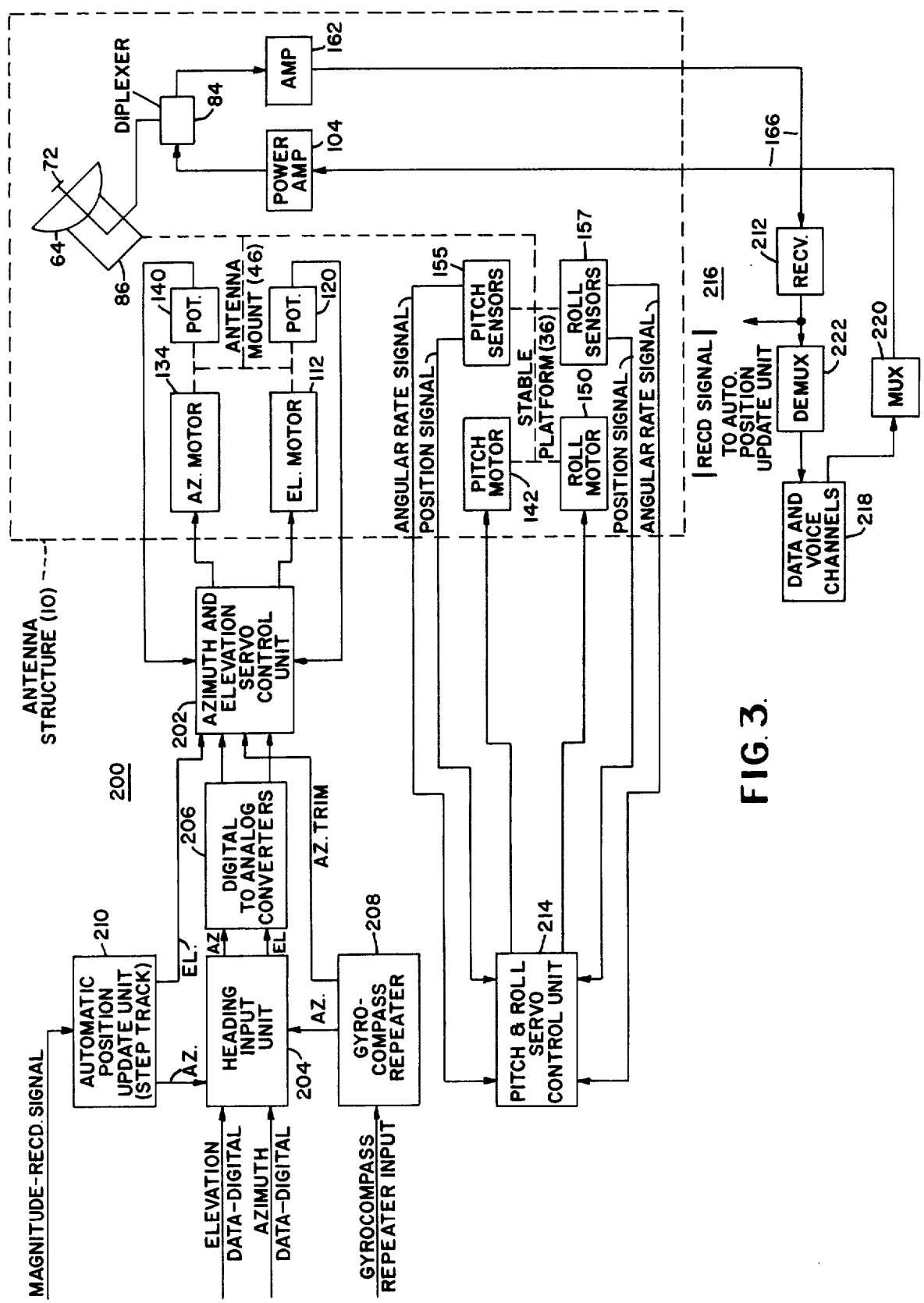
FIG. 3 is a block diagram of a maritime satellite communications terminal embodying the invention.
Figure 4:
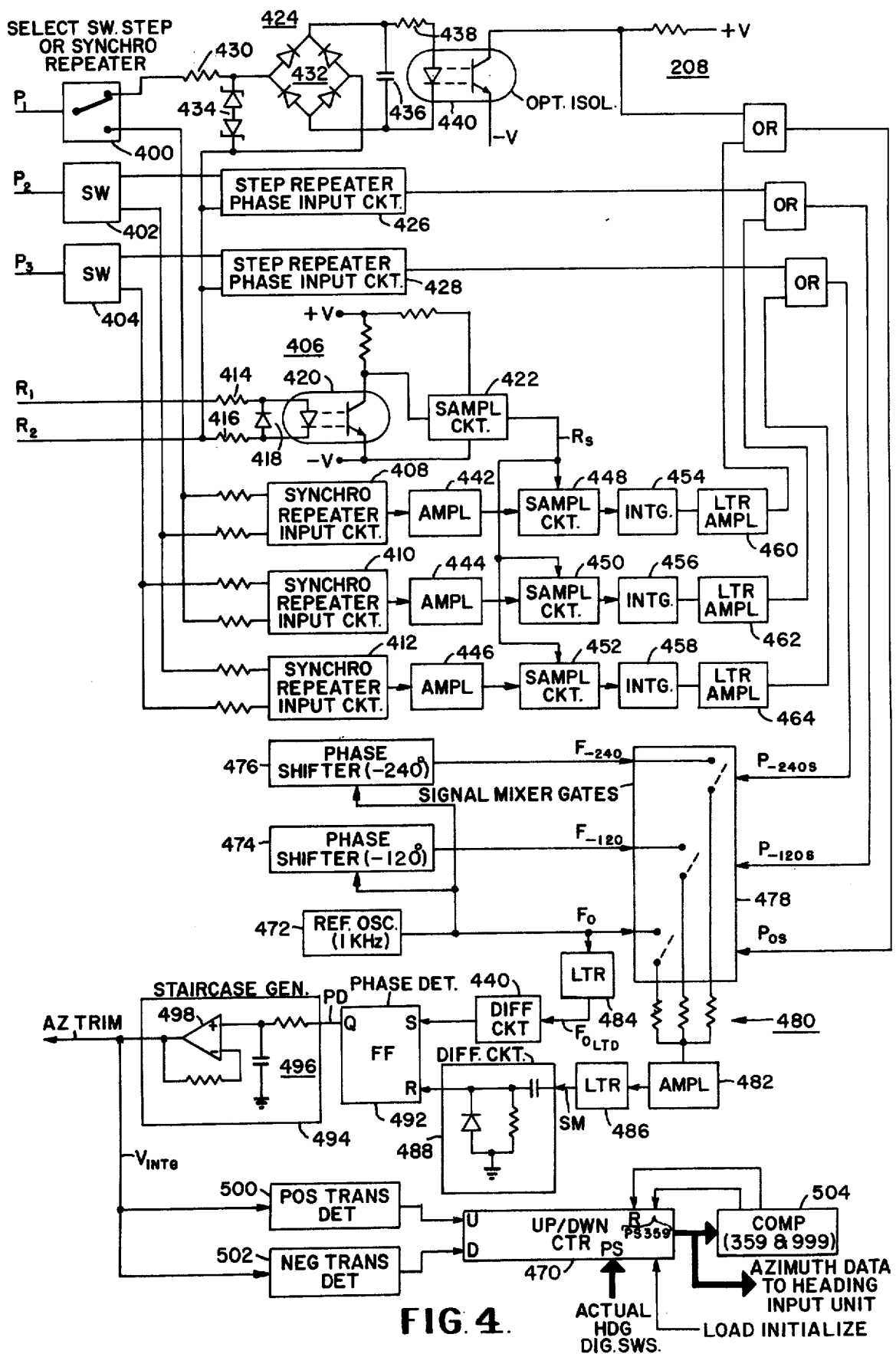
FIG. 4 is a diagram partly in block and partly in schematic form showing in detail the gyrocompass converter unit of the terminal illustrated in FIG. 3.
Figure 5A:
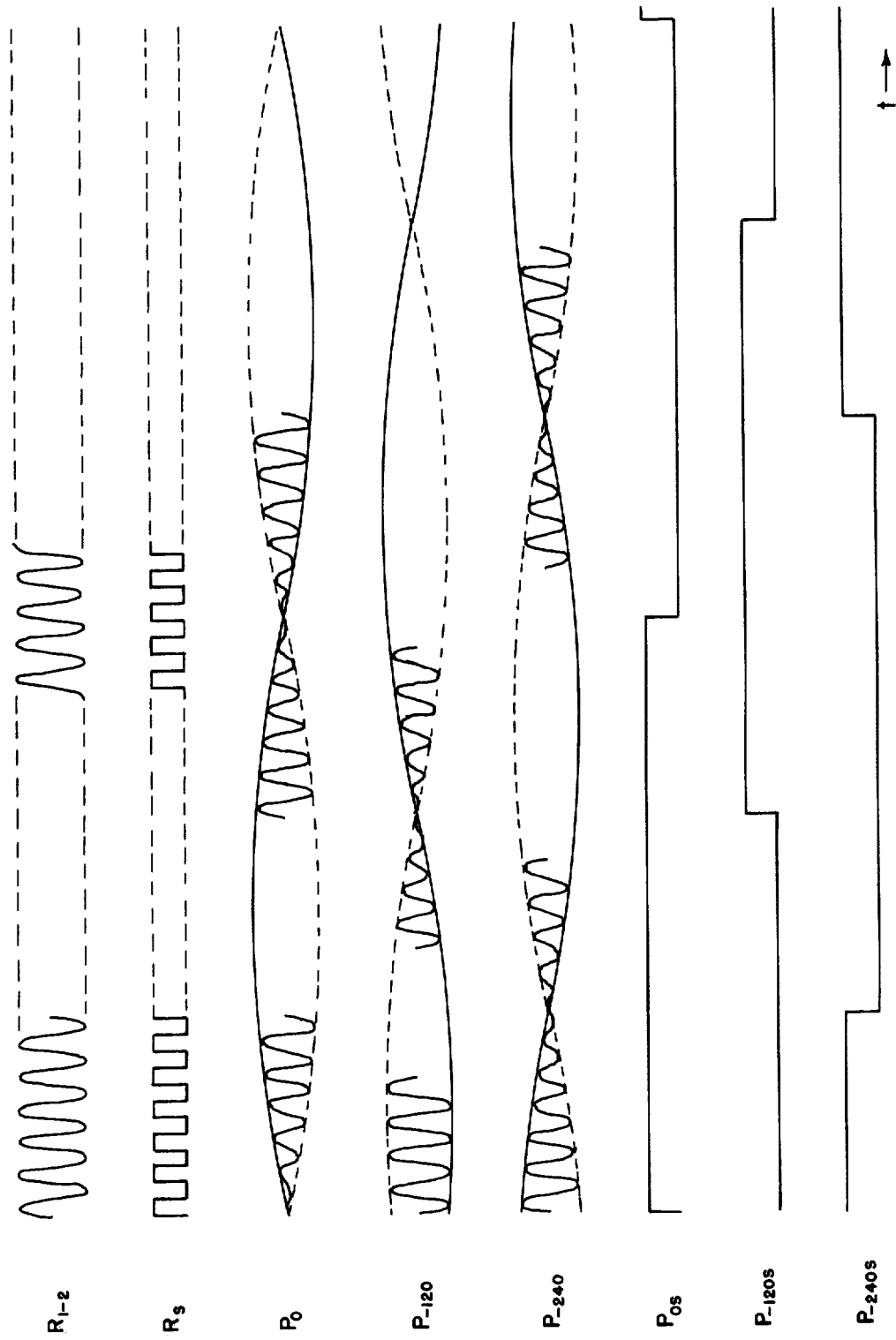
Figure 5B:
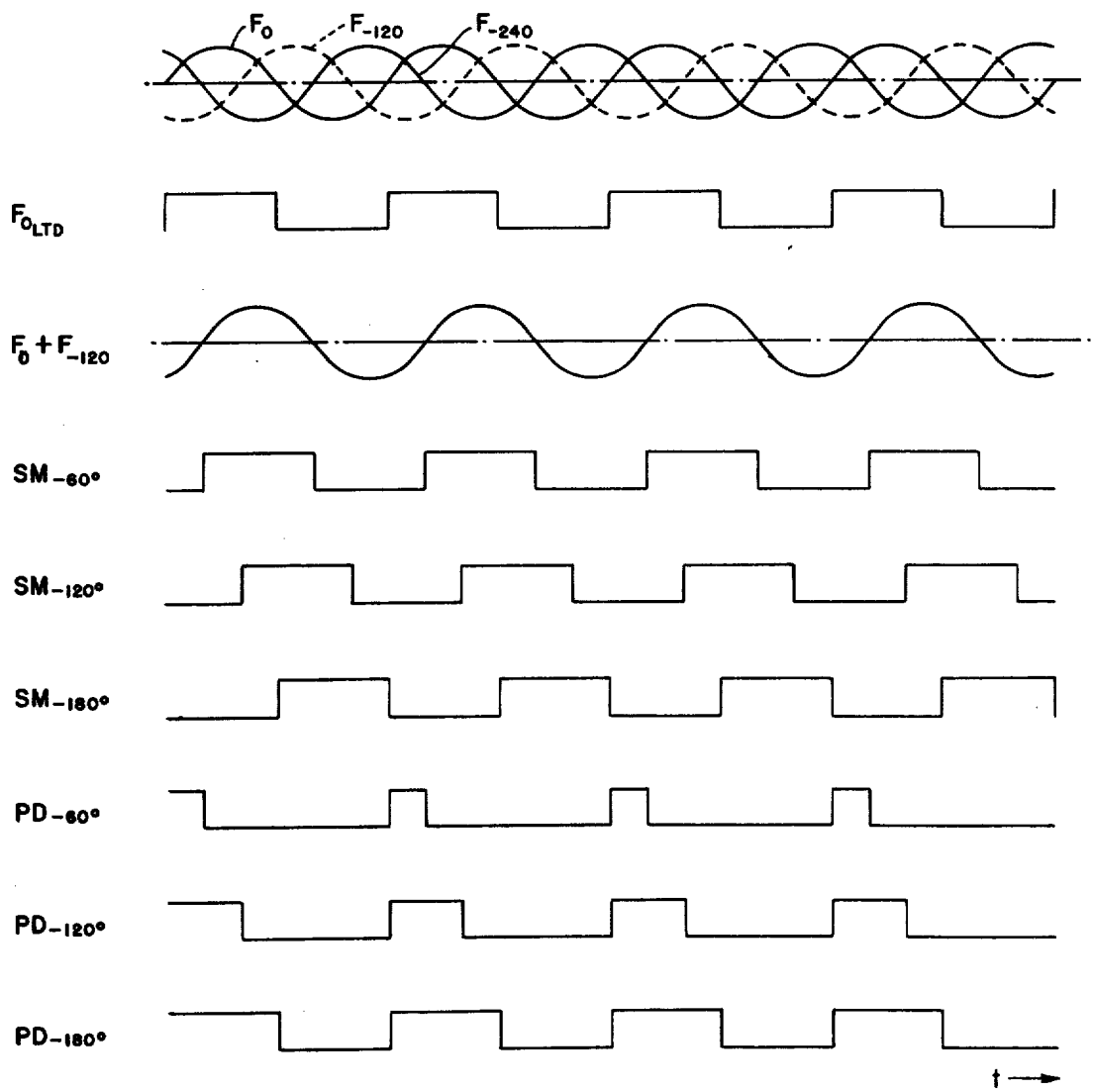
Figure 5C:
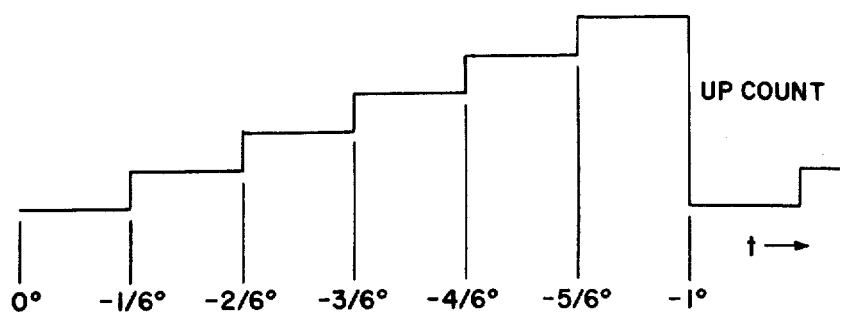
Figure 6:
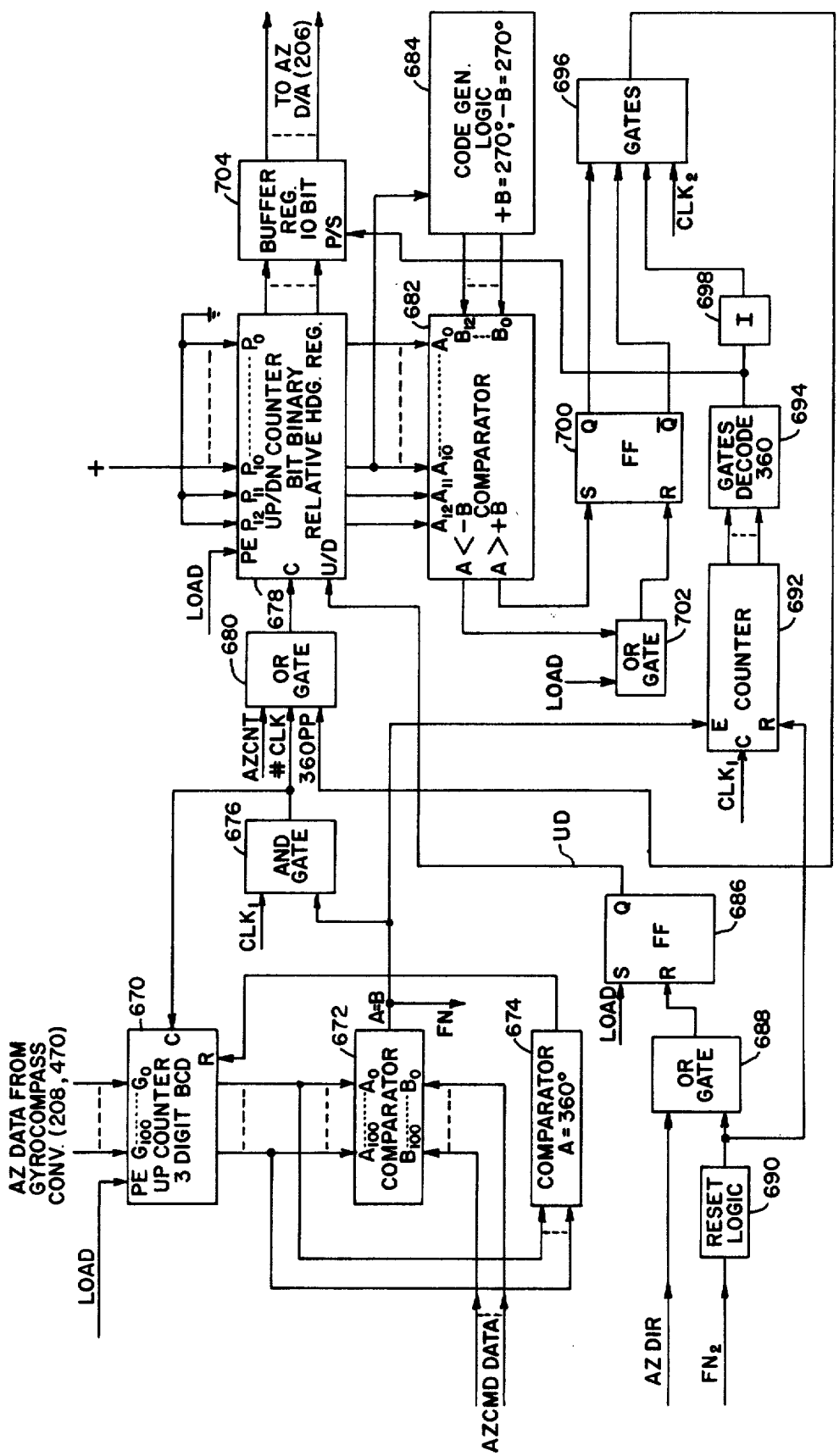
Figure 7:
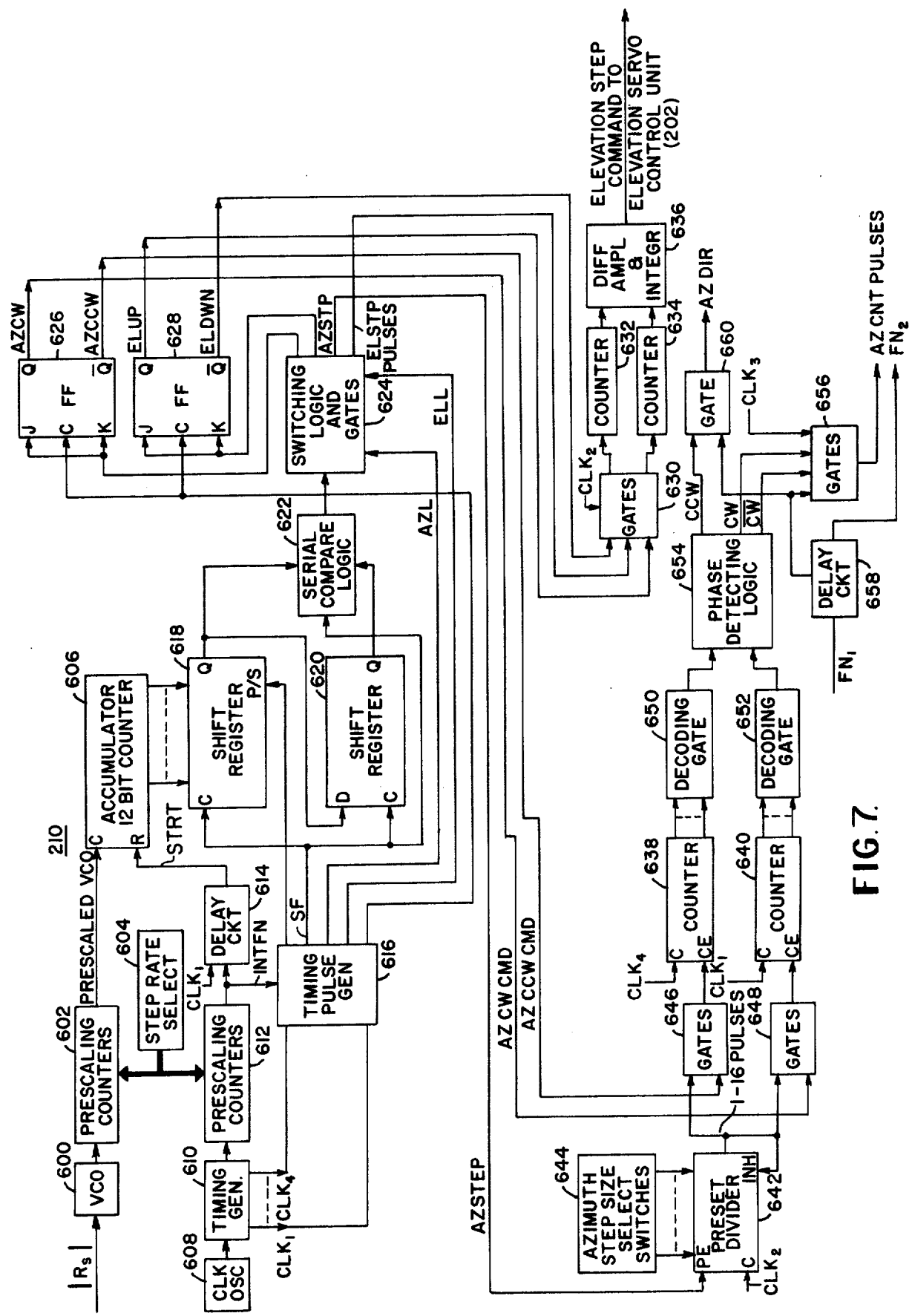

FIGS. 5A, 5B, and 5C are series of waveforms which are used to explain the operation of the gyrocompass converter unit shown in FIG. 4;

FIG. 6 is a block diagram showing the heading input unit of the tracking system of the terminal illustrated in FIG. 3;

FIG. 7 is a block diagram showing the automatic position update unit of the tracking system illustrated in FIG. 3;

FIG. 8 is a block diagram which schematically illustrates the pitch servo control unit and its associated sensors which are part of the tracking system shown in FIG. 3;

FIG. 9 is a block diagram which illustrates a motor drive unit of the servo control units shown in FIG. 8;

FIG. 10 is a block diagram of another embodiment of the motor drive unit shown in FIG. 8;

FIG. 11 is a series of waveforms used to explain the operation of the motor drive unit shown in FIG. 10; and FIG. 12 is a schematic diagram of the bi-directional voltage controlled oscillator of the motor drive unit shown in FIG. 10.

Figure 1:
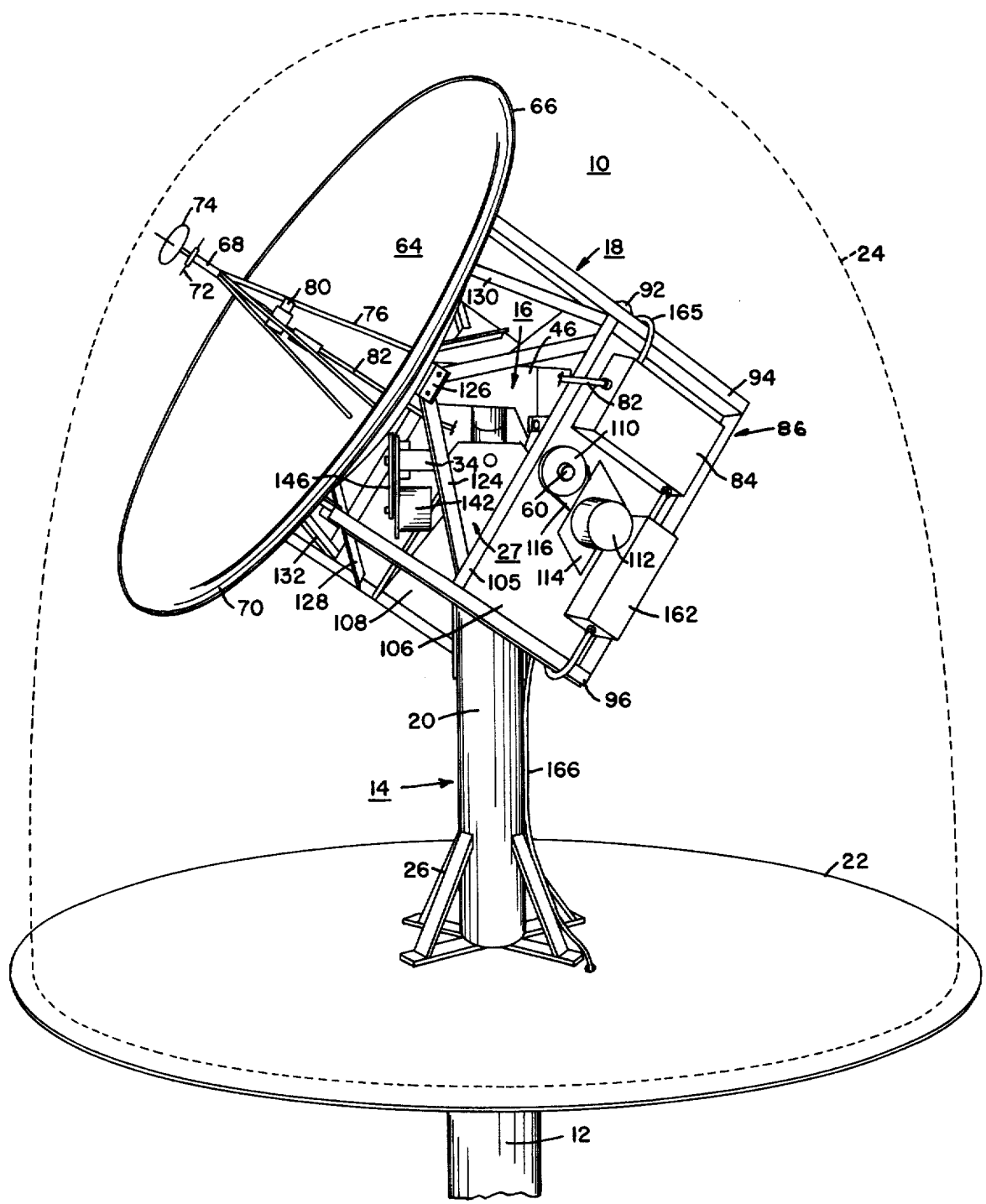
FIG. 1 is a perspective view of the antenna structure of a maritime satellite tracking system embodying the invention.
Figure 2:
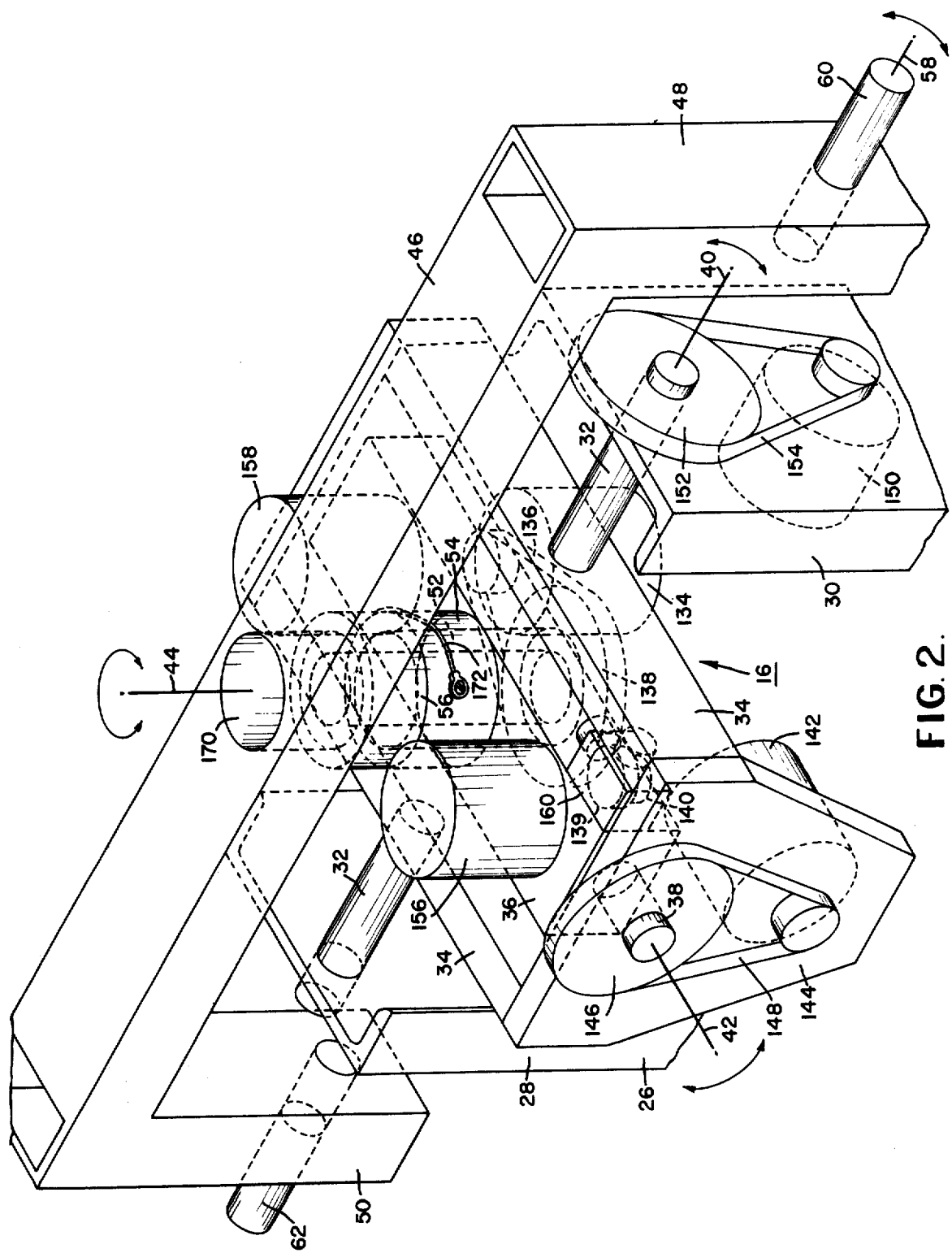
FIG. 2 is a simplified perspective view of the stable platform and associated apparatus which forms part of the antenna structure shown in FIG. 1.

Referring first to FIGS. 1 and 2, there is shown a satellite tracking antenna structure 10 adapted to be mounted on the top of a mast 12 of a vessel having a satellite communication terminal which is described more fully hereinafter in connection with FIG. 3. This terminal contains a system embodying the invention for controlling the antenna so that it remains pointed in the direction of the satellite and also equipment for transmitting and receiving messages so as to provide ship-to-ship or ship-to-shore communications via the satellite. The antenna shown in FIGS. 1 and 2 is the subject matter of a related application filed concurrently with this application in the name of LeRoy Fuss, III, Ser. No. 598,457 and assigned to the same assignee as this application.

The principle parts of the antenna structure are its pedestal arrangement 14, a stable platform arrangement 16, and an antenna assembly 18. The stable platform arrangement 16 is shown in FIG. 2.

The pedestal arrangement 14 consists of a cylindrical tube 20 disposed on a circular base 22. A radome 24, illustrated by the dash lines, encloses the entire antenna structure and is secured to the base 22. An arrangement of legs and crossbars 26 which may be welded to the post 14 and bolted to the base, supports the post on the base. An arrangement of bolts extending from the bar arrangement 26 through the base 22, secures, through suitable brackets, the base and post to the head of the mast 12.

A U-shaped yoke 27 having side members 28 and 30 in the form of channels is secured to the upper end of the post 20. A shaft 32 journaled in these side members 28 and 30 defines the roll axis 40 of the stable platform 16.

The stable platform arrangement 16 is made up of a frame 34, the opposite sides of which are attached to the shaft 32 (see FIG. 2). The stable platform 36 is pivotally mounted within the frame 34 on a shaft 38. The shaft 38 is journaled in the side members of the frame 34 and is attached to the platform 36. The pitch axis 42 of the platform is defined by the axis of the shaft 38. The roll axis 40, pitch axis 42 and the azimuth axis 44, which extends downwardly to the center of the stable platform, are all perpendicular to each other and intersect at a common point. The pitch and roll axes 40 and 42 lie in the same plane. A turntable 46 is mounted on the platform 36 for rotation about the azimuth axis 44. The turntable 46 is a U-shaped member having downwardly depending arms 48 and 50. The center of the turntable is driven by a shaft 52 which extends through a bearing cylinder 54 mounted on the platform 36. The shaft 52 extends from a cylinder 56 of approximately the same diameter of the cylinder 54. The shaft 52 is pivotally mounted in bearings inside the cylinder 54, which bearings support the turntable 46. The elevation axis 58 is defined by the axis of shafts 60 and 62 which extend laterally from the arms 48 and 50 of the turntable 46. The elevation axis 58 is perpendicular to the azimuth axis and is approximately co-incident with, or slightly below the roll axis.

The terms pitch and roll are used arbitrarily so as to simplify the description. It will be appreciated that the pitch axis will become the roll axis and vice versa if the post 20 and yoke 26 of the pedestal arrangement is turned 90 degrees about the azimuth axis 44.

The antenna assembly 18 is pivotally mounted on the shafts 60 and 62 for rotation about the elevation axis 58. The entire antenna assembly 18 is supported by the turntable 46 at the shafts 60 and 62. The antenna assembly 18 consists of an antenna 64 made up of a parabolic reflector dish 66 and a feed 68. The dish 66 is preferably spun from perforated thin gauge aluminum and has a rolled edge 70 to provide mechanical stiffness. The feed 68 is made up of crossed dipoles 72 behind a reflector disc 74. The feed is mounted on an arrangement of rods 76 which form a tripod. The outputs of the feed may be combined in a hybrid 80 which is connected to a cable 82 extending through the center of the dish 66. The cable is connected to a diplexer 84 which is mounted on the antenna structure 18.

The reflector dish 66 forms one end of a box structure 86. The remainder of this box structure 86 consists of side members and an arched beam structure 92 which provides mechanical stiffness and rigidity without increasing weight of the antenna structure 18. The arched beam structure 92 also affords an open space behind the turntable 46 so as to permit the antenna assembly 18 to rotate at least ninety degrees in elevation. The axis of the antenna can be pointed vertically, horizontally as well as any elevation between the vertical and horizontal. The side members are attached to the rear of the reflector dish 66. The elevation axis shafts 60 and 62 extend through journals in plates 106 and 108 which form part of the side members of the box structure 86.

The antenna 18 is bodily rotatable about the elevation axis shafts 60 and 62. To this end a pulley 110 is fixedly mounted, as by being keyed, to the shaft 60. An electric motor which is operative as the elevation servo motor 112 is mounted on a bracket plate 114 located on the plate 106. The shaft of the elevation motor 112 drives a timing belt 116 which is trained around the pulley 110. The pulley 110, belt 116 and motor drive pulley are preferably toothed. The elevation motor 112 moves in a planetary fashion about the pulley 110. Consequently the entire antenna assembly 18 moves bodily about the elevation axis shafts 60 and 62. A potentiometer 120 is mounted on the plate 108. The shaft of the potentiometer 120 is attached to the elevation axis shaft 62. The resistance presented by the potentiometer 120 is therefore a function of the rotation of the antenna 64 about the elevation axis.

Additional rigidity is imparted to the box structure 86 by struts which may be angle members and which form triangular braces 124 in the left side member. These struts are connected at their apex by way of brackets to the rear of the reflector dish 66. These braces 124 are made out of angle members. Similar braces 128 are provided in the right side member. Triangular braces 130 and 132 are also provided in the box structure 86.

As shown in FIG. 2, the azimuth shaft 52 is rotated by an azimuth servo motor 134 which drives a toothed timing belt 136. A pulley 138 which is also toothed is driven by the belt 136. The pulley 138 is keyed to the azimuth shaft 52. The azimuth motor is secured, as by being mounted on a bracket, on the underside of the platform 36. The outer periphery of the timing belt 136 as well as the inner periphery thereof may be toothed and used to drive the shaft 139 of a potentiometer 140, also mounted on the underside of the platform 36. The resistance presented by the azimuth potentiometer 140 corresponds to the angular position of the antenna 64 in azimuth.

The stable platform 36 is oriented by a pitch motor 142 mounted on a side 144 of the frame 34 (see FIG. 2). The pitch shaft 38 is keyed to a pulley 146 which is driven by the pitch motor 142, preferably via a toothed timing belt 148. The stable platform 36 together with the frame 34 is rotated about the roll axis 40 by a roll servo motor 150 which is mounted on the arm 30 of the yoke which extends upwardly from the post 20. A pulley 152 keyed to the roll shaft 32 is driven by a timing belt 154. The shaft of the roll motor 150, the belt 154 and the periphery of the pulley 152 are also preferably toothed.

The motion and the position of the stable platform 36 is sensed by pitch and roll sensors 155 and 157. These sensors consist of a pair of rate transducers 156 and 158 which are mounted on the platform 36 on opposite sides of the cylinder 54 in which the azimuth shaft 52 is journaled. These transducers are preferably fluid rate sensors. They are solid-state devices which monitor short-term motions of the platform. One of these devices 156 has its fluid path parallel to the roll axis while the other 158 has its fluid path parallel to the pitch axis. The device 156 therefore functions as a pitch rate sensor while the device 158 functions as a roll rate sensor. Suitable devices may be of the type described in U.S. Pat. No. 3,500,691, issued Mar. 17, 1970, and may be procured from Humphreys, Inc., of San Diego, Calif., 92123. The long term motion of the platform 36 is detected by position or level sensors 160 which are mounted along an edge of the platform. One of these level sensors senses the angular position of the platform 36 relative to the local vector about the pitch axis, while the other senses the angular position of the platform relative to the local acceleration vector about the roll axis. These position sensors may be devices containing bodies of fluid partially filling tubes, one of which has its axis parallel to the pitch axis and the other of which has its axis parallel to the roll axis. Electrodes are provided in spaced positions on opposite sides of the bodies of fluid. The fluids act as a dielectric and change the capacitance presented between the electrodes as a function of the angular position of the fluid in the tube. Suitable position sensors may be procured from Spectron Glass and Electronics Co., of Uniondale, N.Y. The outputs of the rate sensors 156 and 158 and of the position sensors 160 are used in a servo control system described in detail hereinafter in connection with FIGS. 3 and 8 to 12, for providing control voltages to the pitch motor 142 and the roll motor 150 in order to maintain the platform stable. The system maintains the platform 36 stable entirely through the use of solid-state devices and without the need for gyroscopic sensors or stabilizers which are generally unsuitable for use on board ship where vibrations oftentimes produce noise and saturate servo control systems. In maritime environments, a gyroscopically controlled or stabilized system may be inoperative to maintain a platform in stable position in spite of the pitching and rolling motion of the ship.

It is desirable that the weight of the antenna 64 be counter-balanced so as to minimize the torque requirement of the elevation motor 112. Counter-balancing weight is provided generally without the addition of any unnecessary weight by the diplexer 84 and a low noise amplifier 162 which are mounted on the plate 106 of the left side member 88 and by power amplifier 164 which is mounted on the plate 108 of the right side member. Additional weights may be provided on the side arm as well as on the frame 34 and stable platform 36 for counter-balancing purposes, as needed.

A cable 166 which carries electrical signals and power between the antenna 10 and other equipment of the satellite communications terminal which may be located below decks in the ship is provided with a cable wrap having sufficient slack so as to permit the antenna structure 18 to rotate both in azimuth and elevation by a desired degree of azimuth rotation and elevation travel, for example, over 270° of azimuth rotation and 90° of elevation travel. The cable 166 may be a multi-conductor cable which extends upwardly through a central opening in the azimuth pulley 138 and azimuth shaft 52 and then through an opening 170 in the turntable 46. Appropriate connectors may be provided in the base at the foot of the post 20 for the cable 166 and the cable may be brought up from the connector through a central longitudinal passage in the post 20 which may be tubular, if desired.

Suitable stops may be located in the turntable 46 to limit the travel of the antenna structure 18 in elevation. A strap 172 one end of which is connected to the cylinder 56 which rotates with the turntable, and the other to the cylinder 54 which is mounted on the platform 36, serves to limit the azimuth rotation of the turntable 46 and therefore of the antenna.

It will be observed from FIG. 1 that the arched beam structure 92 is disposed immediately to the rear of the turntable 46. A large, clear area or space is thereby provided in the rear of the box structure 86 in which enables the antenna 64 and the entire box structure 86 to move bodily in elevation a full 90 degrees. At the same time, the arched beam structure affords a high degree of rigidity to the box structure and the entire antenna apparatus.

The antenna structure 10 is part of the satellite communications terminal shown in FIG. 3, to which reference is now made. The terminal consists of a tracking system 200 which serves to orient the antenna 64 so that it remains pointed in the direction of the satellite. The tracking system 200 includes the azimuth and elevation motors 134 and 112 and their associated potentiometers 140 and 120, the pitch and roll motors 142 and 150, and the pitch and roll sensors 155 and 157. The azimuth and elevation motors 134 and 112 and their potentiometers 140 and 120 are operationally associated with an azimuth and elevation servo control unit 202. This unit 202 is operated by a heating input unit 204 and digital to analog converters 206. The heading control unit 204 provides digital signals to the converters 206 which in turn provides the control signals which maintain the selected pointing angle of the antenna 64 to the satellite.

Azimuth and elevation command data from manually operated digital switches (e.g., thumbwheel switches which provide binary coded decimal (BCD) outputs) is inputted to the unit 204. A gyrocompass converter unit 208 translates inputs from the gyrocompass repeaters on board the ship into digital signals representing the ship's actual heading azimuth and applies these signals to the heading input unit where the relative bearing from the ship's heading and the azimuth command data is obtained and outputted as a digital heading (azimuth) control signal to the converters 206.

An automatic position update unit 210, which may optionally be included, continually provides digital azimuth and elevation signals to the heading input unit to change the digital azimuth and elevation control signals to allow tracking of the satellite without operator manual updating (viz., manipulation of the azimuth and elevation digital switches except ocassionally, say at the start of a voyage). The update unit 210 receives the satellite signal, preferably a beacon signal, which may be transmitted from the satellite. This signal is picked up by the antenna 64, amplified in the low noise amplifier 162 and detected in a receiver 212 which also forms part of the terminal. The update unit 210 responds to changes in the strength (magnitude) of this beacon signal. In the event that a beacon frequency is not transmitted, the receiver's automatic gain control (AGC) signal may be used. The receiver AGC signal may suitably be derived from the beacon signal frequency when the satellite is designed to transmit the beacon signal. From the changes in signal strength, azimuth and elevation offset data are obtained. The azimuth offset is combined with the relative bearing data in the heading input unit 204 to provide the azimuth control signal. The elevation offset is provided in analog form by the unit 210 and is combined with the elevation signal from the digital to analog converters which represents the command data derived from the elevation thumbwheel switches by the heading input unit 204 to provide a composite elevation command signal. The azimuth and elevation offsets are suitably obtained periodically, say at one hour intervals. The automatic position update unit may therefore be referred to as a step-track unit.

The azimuth and elevation servo control unit 202 compares the azimuth and elevation command signals obtained from the digital to analog converters with the position feedback signals from the azimuth and elevation potentiometers 140 and 120 and generates position error drive command signals which are applied to the azimuth and elevation motors 134 and 112. These motors are preferably stepping motors and the drive commands are then bi-phase sinusoidal voltages having a polarity and frequency proportional to the position error. Motor drive units for developing these sinusoidal voltages are described hereinafter in connection with FIGS. 9 to 12.

Inasmuch as the antenna structure is designed to travel over a limited range, ± 270° as described above, the heading input unit has means for performing limit checks for either +270 or −270° while allowing continuous tracking without exceeding the +270 or −270° limits. If the relative bearing (including steptrack offset) is greater than 270° an offset of 360° counterclockwise is automatically derived and represented in the azimuth control signal. Similarly, if the relative bearing is an angle of less than −270° the azimuth control signal drives the antenna 360° clockwise.

When pointing the antenna, the elevation and azimuth coordinates of the satellite relative to the ship's position are obtained from a lock-up table which is obtained by conventional astronomical calculations based on the satellite orbit. These coordinates are set up in the thumbwheel switches. The antenna 64 assumes the position corresponding to the coordinates and points at the satellite. A signal from the satellite is received and the thumbwheel may be adjusted slightly until maximum signal is obtained. If the steptrack unit 210 is then enabled, the antenna automatically tracks the satellite. If this unit 210 is not used, the thumbwheels should be adjusted at least daily until maximum received signal magnitude is obtained. Displays (e.g., light emitting diodes — LED) (not shown) are desirably provided for readout in digital form of the azimuth and elevation feedback potentiometer 120 and 140 signals (i.e., the data which are provided to the azimuth and elevation control units 202). This shows the true position of the antenna and may be used for verification of its position.

The tracking system 200 has a pitch and roll servo control unit 214 which processes the angular rate and position signals from the pitch and roll sensors 155 and 157 and provides drive command signals to the pitch and roll motors 142 and 150 to maintain the stable level position of the platform 36 to which the antenna mount 46 is secured for rotation in elevation and azimuth. The pitch and roll motors 142 and 150, like the azimuth and elevation motors 134 and 112 are preferably stepper motors. The drive commands are, as discussed above in connection with the azimuth and elevation servo control unit 202, preferably bi-phase sinusoidal voltages. The polarity and the frequency of these voltages are proportional to composite position and rate errors derived in the pitch and roll servo control unit 214 from the angular rate and position signals produced by the sensors 155 and 157; the pitch sensors 155 providing the signals from which the pitch motor drive voltage is obtained and the roll sensor 157 providing the signals from which the roll motor drive voltage is obtained.

The unit 214 is discussed more fully in connection with FIG. 8 and the motor drive unit which produces the bi-phase sinusoidal voltages is discussed in connection with FIGS. 9 to 12. It is a feature of the invention to eliminate the need for tachometers or rate servo loops in the pitch and roll servo control unit 214.

In addition to the antenna structure 10 and the tracking system 200, there is provided in the terminal, communications equipment 216 for transmission and reception of data, voice and other signals via the satellite. Data and voice channels 218, may handle teleprinter signals (e.g., PSK or PSK modulated signals) and voice signals in separate channels. Time division or frequency division multiplexers (MUX) 220 are used to supply signals from each channel for transmission by the antenna 64 after amplification in the power amplifier 164. The signals received from the antenna are amplified in the low noise amplifier 162. The signals received from the antenna are amplified in the low noise amplifier 162. The transmitted and received signals which may be in different bands (e.g., 1636 – 1645 MHz for the transmmit band to the satellite, and 1535 –1543 MHz for the receive band from the satellite) are first separated in the diplexer 84. The received signals are translated to baseband in the receiver and applied to a demultiplexer (DEMUX) 222 which segregates the received signal into the several data and voice channels. Control equipment of the type conventionally used in telephone systems are provided for selection of available ones of the channels.

The gyrocompass converter 208 unit shown in FIG. 4 is designed to convert synchro or three-coil D.C. step-by-step repeater outputs into a digital word representing the ship's actual heading. This word is in three digit BCD format so as to be compatible with the azimuth command data which is applied together with the gyrocompass converter word to the heading input unit 204 (FIG. 1). The repeaters are operated by the ship's gyrocompass. Merchant ships customarily are equipped with 360 or 180 speed repeaters. For the purpose of this description, repeaters are taken to be 360 speed devices. One revolution (360°) corresponds to one degree of bearing. The repeater phase winding terminals $P_1$, $P_2$ and $P_3$ (whether delta or star connected) are connected to switches 400, 402 and 404 which select either D.C. step-by-step or synchro repeater inputs. The switches are shown in the position for selecting D.C. step-by-step repeaters. The reference or rotor winding terminals $R_1$ and $R_2$ of the repeaters are connected to reference winding input circuit 406. Similar input circuits 408, 410 and 412 are provided for each phase of the synchro repeaters. Since the reference winding input circuit 406 is typical, it alone will be described in detail. Series isolation resistors 414 and 416 are connected to the winding terminals $R_1$ and $R_2$. A diode 418 clips one phase or polarity of the reference wave. An optical isolator 420, including a light emitting diode and phototransistor, provides high voltage isolation between the converter 208 and the repeater bus. The voltage across the collector resistor of the phototransistor then follows phase or polarity of the repeater coil voltage which is not clipped by the diode and is used as the output of the input circuit 406. In the case of the reference winding input circuit, the output is shaped by applying it to a sampling circuit 422 which is a solid-state switch, suitably of integrated circuit type, say part of a 4016 CMOS integrated circuit. The collector voltage acts as a control voltge and connects the positive supply voltage supply, shown at +V, to the output of the sampling circuit 422 when the phototransistor is conductive. Otherwise the negative voltage supply shown at −V is connected to the sampling circuit output. FIG. 5A shows the sinusoidal voltage $R_{1-2}$ across thhe reference winding, while $R_s$ is the waveform at the output sampling circuit 422.

Input circuits 424, 426 and 428 are provided for each phase of the step repeater. The input circuit 424 is typical. An isolation resistor 430 and a bridge rectifier 432 are connected across the phase winding (viz., from $P_1$ to $R_2$). A pair of back-to-back zener diodes 434 limit the voltage across the rectifier. Either polarity of D.C. phase winding voltage is accepted and is applied via a filter made up of a capacitor 436 and a resistor 438 to an optical isolator 440, like the isolator 420. Whenever the phase winding has a voltage induced therein, which will be for a 181° sector of a revolution of the repeater shaft, the level at the collector of the phototransistor will be low (which is the enabling level to the sampling circuits). Each of the step repeater input circuit 424, 426 and 428 thus provide output levels which are displaced 120° with respect to each other and depend upon the position of the repeater shaft. These voltages are illustrated as three waves $P_{0s}$, $P_{-120s}$ and $P_{-240s}$ in FIG. 5A.

Similar voltages are obtained from each phase of the synchro repeater, when selected by the switches 400, 402 and 404. The outputs of the synchro repeater input circuit are sinusoidal waves, as illustrated in waveforms $P_0$, $P_{-120}$ and $P_{-240}$ in FIG. 5A. By virtue of the operation of the synchro repeater, the phase of the sinusoidal voltage from each phase winding relative to the phase of the reference waves depends upon the angular position of the phase winding (see the text "Principles of Radar" by Reintjes and Coate, McGraw Hill, 1952, Chapter V, for a detailed discussion of the operation of synchros). The sinusoidal phase voltages at the outputs of the circuits 408, 410, and 412 are amplified in amplifiers 442, 444 and 446, and are sampled by the reference pulses $R_s$ from the reference wave sampling circuit 422, in other sampling circuits 448, 450 an 452. When the reference pulses and phase voltages are of like polarity the sampling circuit outputs are positive pulses, and conversely when the reference pulses and phase voltages are of opposite polarity the sampling circuits 448, 450 and 452 outputs are zero level. The sampling circuit outputs are integrated in integrating circuits 454, 456 and 458 so as to translate the positive pulses into positive levels. Limiter amplifiers 460, 462 and 464 are used to equalize these levels at voltages equal to the voltage levels produced by the step repeater phase input circuits 425, 426 and 428. OR gates 466, 468 and 470 provide these levels either from the step repeater or synchro inputs, depending upon which inputs are selected by the switches 400, 402 and 404, for further processing.

The phases of the repeater output voltages $P_{0s}$, $P_{-120s}$ and $P_{-240s}$ are fixed. The voltages themselves change with changes in heading. Consider for example, a certain heading of 159°, then the $P_{0s}$ and $P_{-240s}$ voltages are high and the $P_{-120s}$ voltage is low. If the heading changes one-sixth degree there results a change in the levels corresponding to 60°, since the exemplary repeater is a 360 speed device. Then only the $P_{0s}$ voltage is high. An additional change in heading of one-sixth degree results in the $P_{0s}$ and $P_{-120s}$ voltages being high. A different repeater output voltage or pair thereof results for each additional one-sixth degree of heading change. The sequence in which the repeater output voltages and voltage pairs occur depends upon the sense of the heading change. These sequences are detected and translated into a digital number which is stored in a counter 470. The counter number is read out into the heading input unit 204 (FIG. 3) as the actual heading of the ship.

The repeater output voltages are first converted into pulses having a duty cycle which corresponds to the change in heading. The voltages $P_{0s}$, $P_{-120s}$ and $P_{-240s}$ respectively key three reference sinusoidal waves $F_0$, $F_{-120}$ and $F_{-240}$, which have corresponding phase relationship. These waves have a frequency much higher than the frequency of any of the repeater voltages; for example, 1 KH$_z$ being suitable. Reference waves are generated by a 1 KH$_z$ reference oscillator 472 which provides the reference sinusoidal wave $F_0$ and a pair of phase shift networks 474 and 476 connected to the reference oscillator which provide the waves $F_{-120}$ and $F_{-240}$ which are shifted 120 and 240° in phase relative to the reference wave. The reference waves are shown in FIG. 5B.

Keying is carried out in signal mixer gates 478. These gates may be implemented by a solid state, integrated circuit switch, for example a CMOS integrated circuit type 4016, where the repeater voltages are applied to the control inputs. A summing network 480 of three resistors connected to an amplifier 482 combines the reference waves which have been keyed. The reference wave $F_0$ and the combined reference waves are limited by limiter circuitry 484 and 486. The limiter 486 provides the limited combined wave SM which is in the form of a square wave related in phase to the limited reference wave $F_{0LTD}$ in accordance with the sequence of the repeater output voltages.

Consider the case where only the repeater voltage $P_{0s}$ is high; $P_{-120s}$ and $P_{-240s}$ being low. Then only the reference wave $F_0$ is keyed by the mixer gates 478. The SM output is identical to and in phase with the $F_{0LTD}$ pulses from the limiter 484. This condition may exist in the event that there is no heading change. It may be desirable to shift the phase of the $F_0$ wave slightly, say about 7° before application to the limiter to provide a fixed offset phase relationship so that D.C. output is provided even though there is no heading change. Now, when the heading changes one-sixth degree (see FIG. 5A) the sequence of repeater voltages consisting of $P_{0s}$ and $P_{-120s}$ is produced This keys both the $F_0$ and $F_{-120}$ waves to the summing circuit 480 and the combined wave $F_0$ and $F_{-120}$, as shown in FIG. 5B, is produced. This combined wave is 60° out of phase with the reference wave $F_0$, and when limited produces the pulse train $SM_{-60}$. Now, if the heading changes another one-sixth degree in the same direction, the repeater voltage sequence consists only of the $P_{-120}$ voltage. Only the $F_{-120}$ wave is then keyed. The limiter 486 then provides the $SM_{-120}$ pulse train which is shifted another 60° and is 120° out of phase with the reference pulse train $F_{0LTD}$. Another one-sixth degree heading change results in the repeater voltage sequence $P_{-120}$ and $P_{-240}$. The $F_{-120}$ and $F_{-240}$ reference waves are keyed and combined like the $F_0$ and $F_{-120}$ waves illustrated in FIG. 5B, but produce a combined wave 180° out of phase with the reference wave $F_0$. The limiter 486 then provides the $SM_{-180}$ pulses. For each additional one-sixth degree of heading change a limited pulse train SM, shifted by an additional 60°, is similarly produced. The sequence is repeated for every full degree of heading change.

The pulse train SM is applied to a differentiating and clipping circuit 488 which produces a positive pulse at the leading edge of each SM pulse. The $F_{0LTD}$ pulse train is applied to a similar differentiating and clipping circuit 490. A flip-flop phase detector 492 provides the pulse train PD which has a duty cycle corresponding to the phase relation between the $F_{0LTD}$ and the SM pulse trains. The duty cycle of the PD pulse train therefore is proportional to the heading change. The repetition rate of the PD pulse train is equal to the reference oscillation 472 frequency (1 KHz) since the flip-flop 492 is set by each $F_{0LTD}$ pulse. The SM pulses reset the flip-flop 492 and the time of resetting is later in each pulse period for greater phase shift. For the in-phase case, the SM pulses are in phase with the $F_{0LTD}$ pulses, the duty cycle is zero, unless a small phase offset is introduced in the $F_0$ wave before it is limited, as mentioned above. The $SM_{-60}$ pulse has a short duty cycle, the $SM_{-120}$ pulse a longer duty cycle, the $SM_{-180}$ pulse a still longer duty cycle, and so forth, until for a full degree of phase shift the flip-flop 492 becomes reset and the PD output is a high D.C. level until the reset occurs.

The phase detector output (the Q output of the flip-flop 492) is applied to a staircase generator 494, which is implemented by a RC integrating circuit 496 and an operational amplifier 498. A staircase voltage, as illustrated in FIG. 5C, is produced as the heading changes since the D.C. or average value of the pulse trains PD is proportional to their duty cycle, which varies in one-sixth degree steps. The staircase wave repeats each full degree of change. In the event that the heading change is in the opposite sense (viz., in plus one-sixth degree steps) the staircase wave will, of course, descend. The wave repeats by exhibiting a negative-going transition, each degree of change in heading in one sense (say negative) as shown. A positive transition accompanies a degree of change in the opposite sense.

Positive and negative transition detectors 500 and 502 provide output pulses upon the positive and negative transistors of the staircase wave. The transition detector 500 may include a differentiating circuit followed by a one-shot which is triggered by a positive pulse of greater than a threshold amplitude so as to discriminate against and be responsive only to the larger transition occurring upon a full degree change. The other transition detector 502 may be similar to the detector 500 but be responsive to a negative pulse of at least threshold amplitude. The pulses from the transition detectors 500 and 502 are applied to increment the counter 470, which is an up/down counter, by being connected to the up and down inputs thereof.

The counter is initially preset to the actual ship's heading. This may be accomplished by digital thumbwheel switches which are connected to the phase counter inputs. The actual heading is inputted by a load-initialize command to the counter 470, which command may be generated by a push button. The counter is desirably a three-digit BCD counter to facilitate interfacing with the switches and with the heading input unit 204 (FIG. 1). If the count increases above 359° or below 0°, the counter is set to 0° for the 359° case and to 359° for the 999 case, by a comparator 504 which detects passage through 359 or 0°, by providing a reset pulse upon counts of 359 and 999. Accordingly, once the counter is initialized to agree with the ship's gyrocompass, which initialization should occur whenever the gyrocompass is started or the tracking system 200 is turned on, the gyrocompass converter will assure that the count in the counter agrees with the actual heading. No complex shaft encoders are required, the ship's repeater outputs alone providing the actual heading in digital form.

The gyrocompass converter also provides an azimuth trim voltage. This voltage, which is the amplitude of the staircase, is proportional to the heading in one-sixth degree steps and may be summed with the azimuth potentiometer 140 voltage in the azimuth servo unit 202 (FIG. 1). This provides a tracking resolution of one-sixth degree and smooths the servo response to change in heading.

Referring to FIG. 7 there is shown a system suitable for use as the automatic position update or steptrack unit 210. This unit provides azimuth and elevation step commands in accordance with the received signal strength $R_s$. Since the received signal strength varies in the short term, as with the roll of the ship, it is necessary to integrate the received signal to provide a long term average value of the signal strength which is then used to generate the azimuth and elevation step commands. The integration interval is desirably a relatively long period of time. This interval may be varied in order to suit operational conditions. After the integration or sampling interval, a period of time, say ten seconds, may be allotted for deriving the step commands and orienting the antenna in response thereto.

It is desirable to step the antenna alternately in azimuth and elevation. This allows independent orientation of the antenna in azimuth and elevation such that the antenna is able to step in opposite directions for changes in azimuth and elevation which may be required in order to maximize the received signal strength.

The signal corresponding to the received signal strength is applied to a voltage controlled oscillator (VCO) 600 which produces a pulse train having a repetition rate corresponding to the received signal strength. This pulse train is applied to prescaling counters 602. These are programmable counters which are set by step rate select switches 604 to divide by different ratios corresponding to different step rates, say one step per hour down to one step each ten minutes and at ten minute intervals therebetween. The prescaled VCO output pulses from the counter 602 are counted in a 12-bit counter which serves as an accumulator 606. The count stored in the accumulator over the stepping interval is proportional to the integral of the signal strength over that interval. The prescaling counters 602 insure that the accumulator 606 will not overflow.

The sampling interval is selected by means of a timing chain which provides a start pulse (STRT) which resets the accumulator 606. This timing chain is operated by high frequency clock oscillator 608. This oscillator applies a high frequency, say 250 $KH_z$, pulse train to a timing generator 610. The timing generator 610 may consist of a series of flip-flops which control gates for producing clock pulses $CLK_1$ to $CLK_4$ which are of the same repetition rate, say 62.5 KHz, but are in sequential phase relationship. The timing generator 610 may also include counters for dividing the clock oscillator pulses in frequency and applying them to prescaling counters 612 identical to the counters 602 which are used to prescale the VCO output pulses. The output pulses from the timing chain prescaling counters 612 occur at the termination or finish of an integretioninterval and are labeled INTFN. A delay circuit 614 which is enabled by the INTFN pulse and triggered by one of the clock pulses, produces the STRT pulse a short interval of time after the INTFN pulse. The accumulator 606 is then reset and an integration interval corresponding to the step rate selected by the switches 604 is established; commencing with the STRT and ending with the INTFN pulse. It will be observed that the timing chain functions in the same way as a gate which is enabled for the sampling interval and allows the VCO pulses to be inputted to the accumulator 606 during the interval that the gate is enabled. The timing chain also includes a timing pulse generator 616 which produces a sequence of timing pulse at the conclusion of each integration interval (i.e. upon occurrence of each INTFN pulse) so as to allow the azimuth elevation step command to be derived.

The first of these pulses is applied to the parallel shift (P/S) input of a shift register 618 into which the contents of the accumulator are entered. Next a train of pulses SF is generated by the timing pulse generator 616. These pulses SF are sixteen in number (the shift registers having a sixteen-bit capacity) and may be obtained by the use of a four-bit binary counter. This counter counts one of the clock pulses from the timing generator 610 and when sixteen of such pulses are counted, inhibits the pulses from being applied to the clock input of the shift register 618 and also to the clock input of a similar shift register 620. Since the output Q of the shift register 618 is connected to the serial input D of the shift register 620, the data in the shift register 618 is shifted into the shift register 620. At the beginning of each computation cycle for deriving the step commands, there will be stored in the shift register 620 a digital word corresponding to the integrated signal strenth $R_s$ during a previous step, while the shift register 618 will store, when the P/S pulse is applied thereto, the digital word corresponding to the integrated received signal strength $R_s$ for the current step.

The SF pulses are simultaneously applied to serial compare logic 622. During each computation cycle the bits of the old digital word stored in the shift register 620 are compared with the bits of the current digital word stored in the shift register 618, bit by bit, lowest order bit first. At the end of the sixteen bits, the output of the serial compare logic 622 will be a level which is high when the current digital word from the register 618 is a higher number than the previous digital word from the register 620.

In order that elevation and azimuth step commands may be derived alternately, so that the antenna may be stepped alternately in elevation and then in azimuth, then elevation, etc., switching logic and gates 624 are provided. The timing pulse generator 616 generates two levels AZL and ELL immediately after the last of the SF pulses (viz., after the compare cycle is completed). These two levels AZL ELL may be implemented by means of a triggerable flip-flop logic arrangement which provides a high AZL level and then a high ELL level alternately after the end of each chain of SF clock pulses. When an AZL level is produced, the gates in the switching logic and gates 624 are enabled to provide azimuth step pulses (AZSTP). Conversely when the ELL level is high, gates in the logic and gates 624 are conditioned to pass the elevation step pulses (ELSTP). These gates pass the clock pulses from the timing generator 610. The switching logic and gates 624 also gate the output of the serial compare logic 622 to either an azimuth command flip-flop 626 or an elevation command flip-flop 628. JK flip-flops may be used for the flip-flops 626 and 628. They will store the direction in which the antenna was stepped in azimuth and elevation during the previous step. If the signal strength during the current step increased (the contents of the shift register 618 being higher than the contents of the shift register 620) the state of the flip-flops is not changed. Conversely, if the signal strength diminished, the flip-flops change state. Only the flip-flop which is active during the step, either the azimuth flip-flop 626 or the elevation flip-flop 628 has the level at the output of the serial compare logic 622 gated to its J and K inputs. Accordingly, the flip-flops store the direction in which the antenna was stepped either in azimuth or in elevation, during the previous step. The azimuth flip-flop 626 provides at its Q and $\bar{Q}$ output levels indicating the direction of the azimuth step, either clockwise or counterclockwise. These are labeled as the AZCW command and the AZCCW command in FIG. 7. Correspondingly the Q and $\bar{Q}$ outputs of the elevation flip-flop 628 provide ELUP and ELDWN commands indicating the direction in which the antenna was stepped in elevation, either up or down, during the previous step. The AZSTP and ELSTP pulses are used in concert with the AZCWCMD, AZCCWCMD, ELUP and ELDWN levels to generate the step commands.

The elevation commands and step pulses are converted into an elevation step command, which is an analog signal, by means of a high resolution digital to analog converter consisting of gates 630, counters 632 and 634, and a difference amplifier and integrating circuit 636. The gates 630 normally pass the clock pulses derived from the timing generator 610 simultaneously to both of the counters 632. The counters 632 will then count in phase and their outputs which are applied to the inputs of the differential amplifier 632 are also in phase. The output of the differential amplifier will be zero and the elevation step command is then not produced. When however, an ELDWN level is applied to the gate 630, the gates are enabled to pass the ELSTP pulses so as to inhibit the $CLK_2$ pulses from being applied to one of the counters 632. The other counter 634 operates at the full $CLK_2$ clock pulse rate. Less pulses will be counted in the counter 632, than in the counter 634 during like intervals of time. The pulse train produced by the counter 632 is therefore effectively delayed or phase shifted with respect to the pulse train produced by the counter 634. This delay is detected by the differential amplifier 636 which passes output pulses during the interval between the leading edges of the output pulses from the counters 632 and 634 when these pulses do not overlap. The polarity of the differential amplifier output pulses is a function of the relative phase shift (i.e., whether the counter 632 pulses lead or lag the pulses from the counter 634). These pulses, when integrated, produce an analog voltage which is applied to the elevation servo control unit as the elevation step command.

A similar arrangement of counters 638 and 640 are used to generate the azimuth step command. Inasmuch as the azimuth step command is combined digitally with the azimuth data gyrocompass converter data in the heading input unit 204 (FIG. 1), the azimuth step command is provided in the form of a digital word and specifically a word constituted of a sequence of pulses equal in number to the azimuth step. These pulses are labeled in FIG. 7 as the AZCNT or azimuth count pulses.

It may be desirable to select the size of the azimuth step so that the heading correction upon each step may be adjusted for optimum size base upon antenna beam width and desired pointing accuracy. For example, a maximum step size of one-half degree for a step, may be desired. To this end a preset divider 642 has preset inputs to which levels are applied by way of azimuth step size selection switches 644. The present divider 642 then counts a predetermined number of pulses, say from 1 to 16 pulses, which must be applied to its clock input before the divider 642 provides an output pulse. One of the timing generator 610 clocks is connected to the clock input of the divider 642. The azimuth step pulse line is connected to the pre-set enable input of the divider. Thus, for each azimuth step pulse an output pulse will be provided from the divider 642 for every one to sixteen clock pulses in accordance with the setting of the switches 644. After each cycle, the preset divider is inhibited, the output pulse being applied to its inhibit INH input. Thus, only the selected number of pulses is produced for each azimuth step pulse. These pulses are applied to gates 646 and 648 together with the azimuth commands AZCCWCMD and AZCWCMD.

The output of the gates are applied to the clock enabled input of the counters 638 and 640. When AZCCWCMD is present, the gates 646 pass the preset divider pulses to the clock enable input which serves to inhibit the clock from the timing generator 610 which is applied to the clock input of the counter 638. The counter 638 may be CMOS Integrated circuits, Type 4520, in which the clock enable pulses effectively blank the clock pulses. The number of pulses counted by the counter 638 when CCCWCMD is present is less than the pulses counted by the counter 640. Conversely, when the CWCMD level is present, the counter 640 will count fewer pulses than the counter 638. When the counters 638 and 640 reach a certain count, decoding gates 650 and 652 will provide output pulses. The counters 638 and 640 recycle when they reach their maximum up-count. Accordingly, the decoding gates 650 and 652 produce trains of pulses which are relatively delayed (i.e., phase related). The delay or phase relationship depends upon the number of pulses which the preset divider 642 is conditioned to output as well as whether the CCWCMD or the CWCMD levels are present. These pulses are applied to phase-detecting logic 654. The phase-detecting logic may consist of flip-flop counting chains made up of D-type flip-flops. The final flip-flops in each chain are interconnected such that when the pulses from the decoding gates 650 and 652 are in phase, both flip-flops will be in the same state. The time interval when the flip-flops are not in the same state is proportional to the phaseshift or delay between the pulse trains from the decoding gates 650 and 652. Gates 656 are enabled when at least one of these flip-flops is set, thereby indicating the need for an azimuth step command. The AZCNT pulses are provided by the timing generator 610 clock pulses which are passed when the gates 656 are enabled. The gates 656 however, are only enabled when the heading input unit provides an $FN_1$ pulse to a delay circuit 658. This $FN_1$ pulse is produced, as will be discussed hereinafter in connection with FIG. 6, when the desired azimuth orientation has been computed in terms of the relative bearing between the azimuth command data and the azimuth data from the gyrocompass converter. The delay circuit output pulse, which enables the gates 656, is of duration sufficient to permit the gates 656 to pass the number of azimuth count pulses corresponding to the largest desired azimuth step. A delay circuit also produces the $FN_2$ pulse connoting that the AZCNT pulses have been outputted. Another gate 660 is enabled by the $FN_1$ initiated pulse from the delay circuit 658. This gate 660 also has the output level of an output flip-flop of the phase detecting logic 654 applied thereto. Since the state of this flip-flop corresponds to which one of the CCWCMD or the CWCMD level was present, the output of the gate 660 corresponds to the desired direction of the azimuth step, either clockwise or counterclockwise. This level, labeled AZDIR, is applied with the AZCNT pulses to the heading input unit 204.

The heading input unit 204 is illustrated in FIG. 6. The azimuth data word corresponding to the actual heading of the ship is inputted from the counter 470 of the gyrocompass converter 208 (FIGS. 3 and 4) into parallel inputs $G_0$ to $G_{100}$ of a three-digit BCD up-counter 670 when a load pulse is applied to the parallel enable (PE) input of the counter 670. The azimuth command data from the thumbwheel switches in inputted to the B inputs $B_0$ to $B_{100}$ of a comparator 672. The digit storing stages of the counter 670 are inputted to the A inputs $A_0$ to $A_{100}$ of the comparator 672.

The stages of the counter 670 which go to the A inputs of the comparator 672 also go to A inputs of a comparator 674. The B inputs of the comparator 674 are hard wired to represent a BCD word corresponding to 360. The compare output (A = B) of the comparator 674 is applied to the reset input of the up-counter 670.

Accordingly, whenever the counter 670 counts up to 360° it is automatically reset by the comparator 674 to 0°; azimuth computations in excess of 360° not being allowed. Clock pulses, as from the timing generator 610 (FIG. 7), are gated via an AND gate 676 and applied to the clock input of the up-counter 670. A number of pulses (No. CLK) is therefore gated to upcount the counter 670 until the azimuth command data word equals the data word in the counter 670. One No. CLK pulse is outputted for each degree in azimuth. Since the up-counter 670 was preset to the actual ship's heading, the number of these clock pulses No. CLK is equal to the difference between the azimuth command heading and the actual ship's heading (i.e., the relative heading which the antenna must assume to point in the direction specified by the azimuth command data).

The No. CLK pulses are applied to the clock input of a 12-bit binary up/down counter 678 by way of an OR gate 680. The counter 678 serves as a relative heading register. The computation cycle when the relative heading is derived is initiated by the load pulses. This cycle may be repetitive at 20 milli-second intervals, for example. The load pulse is also applied to the preset enable input of the counter 678 which serves to input a number representing an angle of 0° in offset binary code into the counter. The 12-bit number which represents 0°, $P_{12}$ to $P_0$ is 001000000000. When the counter is upcounted, the third highest order digit $P_{10}$ remains a one bit, while the other bits increase in accordance with the binary code. When the counter is down counted, the $P_{10}$ becomes a zero and the remaining bits become binary one bits. Thus, by upcounting the counter or downcounting the counter, heading changes in opposite directions may directly be represented. The $P_{10}$ bit, if a one, specifies that the relative heading is in a positive, clockwise sense, while if a zero, specifies that the relative heading is in a negative or counter-clockwise sense. The use of offset binary code simplifies the limit check which is employed in this system to limit rotation of the antenna in azimuth between limits of +270 and −270°, as was explained above in connection with FIGS. 1 and 2.

The limit check is carried out by means of a binary comparator 682 which receives the numbers stored in the stages of the counter 678 at its A inputs $A_0$ to $A_{12}$. The B inputs of the comparator $B_0$ to $B_{12}$ are supplied by code generating logic 684. The B word represents either a number corresponding to +270° or −270°. Which number is generated depends upon whether the relative heading stored in the counter 678 is a positive or negative number. When the number is positive, the limit check is performed at +270° and the digital number $B_0$ to $B_{12}$ inputted to the comparator 682 corresponds to +270°. Conversely, if the number stored in the counter 678 is negative, the limit check is performed at −270° and the $B_0$ to $B_{12}$ number corresponds to −270. The comparator 682 provides two outputs, one when the counter 678 is greater than 270°, and the other when the number in the counter 678 is less than −270°. One of these outputs is produced as a level when the limit is exceeded.

The steptrack unit 210 may, if used in the tracking system, provide the azimuth count pulses AZCNT upon each azimuth step. These pulses are also applied to the counter 678 by way of the OR gate 680. In order that the pulses are applied only after the relative bearing is determined from the azimuth command data and the gyrocompass converter data, the output level from the comparator 672 when the A and B numbers are equal is used as the $FN_1$ signal indicating that a relative bearing computation has been completed. As was explained above in connection with FIG. 7, the AZCNT pulses are applied during the interval between the $FN_1$ and $FN_2$ signals from the steptrack unit.

The steptrack unit also provides the AZDRL level which indicates whether or not the step is clockwise or counterclockwise. At the start of each computation the load pulse sets a flip-flop 686 which provides a level UD to the up/down input of the counter 678. When the flip-flop 686 is set, the UD level represents a binary 1 and conditions the counter 678 to count up. In the event that the azimuth direction is clockwise, the AZDIR level which is applied to the reset input of the flip-flop 686 by way of an OR gate 688 is low. The flip-flop 686 is then not reset and the AZCNT pulses are allowed to up-count the counter 678. Conversely, if the AZDIR level is high, a counterclockwise azimuth step is dictated. The flip-flop 686 is then reset and the AZCNT pulses serve to count the number preset into the counter 678 in a downward direction; thus, representing a counterclockwise azimuth step. After the steptrack cycle, the $FN_2$ level is applied to reset logic 690, which may include a one-shot, and generates a reset pulse which is applied to the OR gate 688. The flip-flop 686 then is in the reset condition until the next computation cycle which is initiated by the load pulse, and the counter 678 is conditioned to count down.

The reset pulse from the reset logic 690 also resets the counter 692. This counter 692 is part of the logic which enters 360 pulses on the 360 PP line into the clock input of the counter 678 by way of the OR gate 680 so as to permit the counter to count down and thereby unwrap the cable (turn the antenna counterclockwise) when the upper limit +270° is reached.

The counter 692 counts the $CLK_1$ pulses from the timing generator 610 (FIG. 7). These clock pulses count the counter up only after the relative bearing has been computed by reason of the output of the comparator 672 (the $FN_1$ level) being applied to the enable input of the counter 692. Accordingly, only after the step track unit has finished its cycle and the AZCNT pulses have been applied to the counter, does an up-count cycle commence. This assures that the limit check is not performed until after an azimuth step is completed. The output of the counter 692 is applied to gates 694 which decode the counter number when the count reaches 360. In other words the gates 694 provide a low output level during the counting cycle between the counts of zero and 360, or for 360 input clock pulses to the counter 692. After 360 pulses are counted the output level of the gates 694 goes high. This level is applied to gate 696 by way of an inverter 698 and enables just 360, and no more, of the $CLK_2$ pulses to be transmitted on the 366 PP line to the OR gate 680 to down-count the counter 678.

It will be recalled that the counter is conditioned to count down by the pulse from the reset logic 690. However, such a down count occurs only if the comparator 682 provides an output indicating that the number in the counter 678 is greater than the 270° clockwise limit. Both the greater than A>B and less than A<B outputs of the comparator 682 are applied to a flip-flop 700. If the counter number A is greater than 270° the flip-flop 700 is set. If the counter number is less than −270° the flip-flop 700 is also reset The flip-flop 700 is also reset by the load pulse by way of an OR gate 702.

Accordingly, unless the upper or clockwise limit is exceeded the gates 696 are inhibited and the 360 pulses are not applied to downcount the counter. Further, if the counterclockwise limit is reached the flip-flop 700 is also reset so as to inhibit the 360 pulses from being applied to down count the counter 678. Since the counter 678 normally counts up and will be counted down only by the 360 PP pulses or by the AZCNT pulses from the steptrack, the azimuth command which is applied to the azimuth digital to analog converter and then to the azimuth servo, insures that the antenna remains within the plus or minus 270° operating sector thereof.

The decode gates 694 provides a transition between low and high levels once during each computation cycle. This level is applied as a parallel entry level to the P/S input of a buffer register 704. The number stored in the counter 678 is then transferred to the register once each computation cycle. The register 704 then isolates the digital to analog converters 206 for the short term variation during the computation cycle so that only the final computation during each computation cycle is utilized in providing the azimuth command.

The steptrack unit 210 is operated so that it produces a maximum of 180 AZCNT pulses per step. Accordingly, the AZCNT pulses, can not alone and without any No. CLK pulses, cause the count in the counter 678 to exceed the limit. There is no interdependence therefore between the steptrack operation and the limit check operation. Consider the case when a negative limit −270° is reached. Although the 360 PP pulses are not applied upon reaching the negative limit, it will be appreciated that there will be a difference between the gyrocompass converter data and the azimuth command data which will be recognized and translated into a sequence of No. CLK pulses on the next computation cycle. Since the up/down counter 678 is conditioned to count up on the next cycle, the number inputted in the counter will always be such as to provide an azimuth command to rotate the antenna in a clockwise direction until the desired heading between the plus and minus 270° limit is obtained. The heading input unit therefore responds to data from all of the sources (viz., the gyrocompass converter, the thumbwheel switches and the steptrack unit) so as to provide azimuth commands to maintain the antenna pointed in the direction of the satellite.

Referring now to FIG. 8, there is shown the pitch servo control 224 system which is part of the pitch and roll servo control unit 214 (FIG. 3). The pitch system receives inputs from the pitch angular rate sensor 156 and the pitch position sensor 160, while the roll system receives its inputs from the roll angular rate sensor 158 and roll position sensor. The mechanical arrangement of these sensors is shown in FIG. 2. The pitch system operates the pitch motor 142, while the roll system operates the roll motor 150. Otherwise the pitch and roll systems are similar.

The angular rate sensors for pitch and roll are also similar and are preferably the fluid devices in which the fluid path (center line of a fluid jet) for the pitch sensor is parallel to the roll axis, while the fluid path (center line of the fluid jet) for the roll sensor is displaced ninety degrees so as to be parallel to the pitch axis. Reference may be had to A.G. Moore, U.S. Pat. No. 3,500,691, which was noted above, for further information respecting the angular rate sensors.

The position sensors 160 are also fluidal devices. The pitch position sensor 160 shown in FIG. 8 is similar to the roll position sensor, except that their fluid paths are oriented, like the rate sensors; the pitch position sensor fluid path parallel to the roll axis, and the roll position sensor fluid path 90° displaced from the pitch sensor fluid path and parallel the pitch axis. The position sensors are toroidal (doughnut shaped) structures 226, which are partially filled with a dielectric liquid 228, e.g., ethylene glycol. The fluid path is therefore perpendicular to the axis of the toroidal structure 226.

A central or axial electrode 230 is provided in contact with the liquid 228 and a pair of outer electrodes 232 and 234 are in contact with the liquid and angularly displaced from each other, symmetrically on the outside of the toroidal structure 226. The central electrode 230 and each of the outer electrodes 232 and 234 form a pair of variable capacitors (shown by the dashed lines) having a capacitance which is a function of the position of the liquid 228. In other words, the sensor 160 provides a capacitive differential which is used to develop a position error voltage which is proportional to the deviation of the pitch axis from a level or horizontal position. The position sensor 160, thus, provides an output which corresponds to deviations from the vertical, but with a solid-state device, thereby obviating the need for gyroscopic devices and similar rotating machinery which are susceptible to unwanted components of position, such as vibrations and centripetal and tangential accelerations which are significant inasmuch as the sensors (both the angular rate sensor 156 and position sensors 160) are located with the antenna structure on top of the ship's mast which may be 50 feet or more above the deck. The position sensor 160 then provides outputs for representing the desired fixed level position of the stable platform 36, while the angular rate sensor provides outputs for keeping the platform in the level position determined by the position sensor. Thus, if the antenna structure was out of level position and was otherwise stationary, as is the case when the system is turned on and power is first applied thereto, there being none of the pendulous type motions which are produced when the ship is at sea and no rate sensor outputs, the position sensor outputs will then cause the antenna structure to erect until the antenna is level. Thereafter as the antenna structure is subjected to pendulous motions the rate sensor outputs cause the antenna to maintain its stable position, all without the need for gyroscopic or similar rotational machinery, or complex servo mechanisms, having rate loops, brakes and the like.

The signal from the rate sensor 156 is amplified by an amplifier 236 which preferably has a low pass filter in its input circuit which blocks any high frequency components in the rate sensor output signal. Thus, signal components due to electromagnetic power line pick-up (e.g., 60 or 120 Hz) vibrations are removed from the rate error signal, which is applied to a summing circuit. This summing circuit consists of two resistors $R_1$ and $R_2$ connected to the summing junction 238 of an integrating amplifier 240. The value of $R_1$ through which the position error signal is applied to the junction 238, is much greater than the value of $R_2$ (e.g, 30 times greater). Thus, in the composite signal produced by combining the position and rate error signals, the rate error signal has a much greater effect that the position error signal. The response of the servo system to changes in position (velocity) of the platform are more rapid than to the position (actual displacement) of the platform with respect to the horizontal, thereby allowing the position sensor output to be used as an inertial reference. The net effect is that the platform remains stable while the ship moves under the platform, the ship being much like the free end of a pendulum.

The differential capacitive circuit provided by the position sensor 160 is utilized by applying 180° out-of-phase signals to the outer electrodes 232 and 234. These signals are obtained by applying a sinusoidal voltage suitably of 400 Hz, to a phase splitter 244 (e.g., an inverting amplifier), which provides the in-phase (+) and out of phase (−) voltages to the electrodes 232 and 234. If the liquid 228 is level, the capacitances between the outer electrodes 232 and 234 and the center electrode 230 are equal, resulting in zero output. On the other hand, if the liquid 228 moves clockwise relative to the toroidal container 226, the capacitance between the center electrode 230 and the outer electrode 232 becomes greater than the capacitance between the center electrode 234. The out-of-phase (−) voltage then becomes greater than the in-phase (+) voltage. Conversely, relative movement of the liquid in the counter clockwise direction results in the in-phase (+) voltage becoming greater.

The phase relationship of the voltage at the center electrode 230 with respect to the in-phase voltage at the input of the phase splitter and the relative amplitude of these voltages, corresponds to the sense and amount of the variation in position of the pitch axis from level, horizontal position.

A D.C. position error signal is provided by coherent or synchronous demodulation of the voltage at the center electrode 230. This voltage is amplified in an amplifier 246 and applied with a reference voltage (the in-phase voltage to the phase splitter 244) to a demodulator 248. The demodulator 248 may be a solid-state analog switch in the form of an integrated circuit to which the reference voltage is applied as a switch control voltage. The demodulator 248 thus samples the sensor output voltage. The samples are applied to a low pass filter 250 which may be part of an integrating amplifier 252. The amplifier 252 is suitably an operational amplifier which has maximal feedback for high frequency (e.g., above 10 Hz components and provides relatively high gain for the low frequency components. The amplitude of the position error signal which is applied to the summing junction 238 resistor $R_1$, is proportional to the change in the position of the pitch axis from level or intertial reference position.

A notch filter circuit 254 is tuned to reject signals at the frequency at which the antenna structure is mechanically resonant. The output of the filter, which may be amplified, is a control voltage $V_c$ which is applied to a motor drive unit 256, where the control voltage is converted into bi-phase (or quadrature related) sinusoidal voltages $V_o \cos wt$ and $+V_o \sin wt$ of frequency proportional to the amplitude of the control voltage and of polarity corresponding to the polarity of the control voltage. These voltages are applied to the windings of a two-phase stepper motor which serves as the pitch motor 142.

The stepper motor 142, by virtue of its being driven by the sinusoidal voltages, provides smooth continuous motion in spite of its being designed for incremental stepping behavior.

The stepper motor 142, which is typical of the other motors used in the tracking system 200, may suitably be a two-hundred pole stepper motor of the type which is commercially available. The stepper motor has two field windings 258 and 260 which are wound on alternate ones of the poles. The rotor 262 contains an assembly of multiple pole permanent magnets. =slip rings or commutators are required. The use of stepper motors is therefore especially advantageous aboard ships where electrical sparking at slip rings and commutators 1 constitute a fire hazard. The stepping action (incremental movement) of stepper motors gives rise to erratic behavior which is a function of the load driven by the motor, and the load must ordinarily be limited so as to reduce the time at the end of each step which must be allowed for the motion to settle (damping) before the next step commences. Such erratic behavior is eliminated in accordance with this invention, and smooth continuous motion which is also continuously variable in speed is obtained by applying the bi-phase (quadrature related) sinusoidal voltages to the phase windings 258 and 260 of the stepper motors. These voltages are limited in magnitude for the stepper motor which, and selected to be of such amplitude that the core material in the stator and rotor does not saturate. The magnetic field $B_t$ produced by the sinusoidal windings will be constant namely $B_t = KV_o \sqrt{\sin^2(wt) + \cos^2(wt)}$   $KV_o$. The angular position of the field, and therefore the position of this rotor 262 is $\theta = \tan^{-2}[\sin(wt)/\cos(wt)] = wt$. The speed of the motor therefore is equal to $w$ which is the frequency of the sinusoidal voltages. Accordingly, the speed of the motor is proportional to the frequency of the bi-phase motor drive voltages. The motor drive circuit 256 produces these voltages such that their frequency is proportional to the control voltage $V_c$. The torque is proportional to the peak value of the amplitude of these voltages and a constant torque is obtained by maintaining the peak amplitude $V_o$ constant. The motor 142 therefore has a smooth rotational velocity which is proportional to the frequency of the bi-phase voltages which in turn is proportional to the amplitude of the control voltage $V_c$.

The sense of the rotation of the stator (viz., the direction of rotation of the motor shaft) corresponds to the polarity of the control voltage $V_c$ with respect to a reference voltage. This reference voltage may be zero volts. Accordingly, when the control voltage $V_c$ is positive, the shaft rotates in one direction (say clockwise) while when the control voltage $V_c$ is negative the shaft will rotate in an opposite direction (counter-clockwise). To reverse the shaft direction a negative frequency $-w$ is used as the frequency of the sinusoidal voltages. This merely requires a reversal in polarity of the $V_o \sin wt$ drive voltage as will be apparent from the governing trigonometric relationships which are set forth below.

$$V = V_o \cos(-wt) = V_o \cos(wt)$$

$$V = V_o \sin(-wt) = -V_o \sin wt$$

The motor drive unit 256 may be implemented, in accordance with the invention, by means of the systems shown in FIG. 9 or in FIG. 10. The system shown in FIG. 10 is preferred inasmuch as its stability with respect to temperature is improved over the system shown in FIG. 9.

Referring first to FIG. 9, the source of the sinusoidal voltages is a reference oscillator 264 which provides a frequency approximately twenty times higher than the maximum desired frequency of the drive voltages. 400 Hz is a suitable frequency. A 90° phase shifter 266 splits the output of the oscillator into sine and cosine (quadrature) components which are applied as inputs to demodulators 268 and 270. These demodulators may be solid-state switches similar to the switches used in the synchronous demodulator 248 (FIG. 8). The control voltages for the demodulators 268 and 270 are obtained from a voltage controlled variable frequency oscillator 272 which has a center frequency equal to the frequency of the reference oscillator 264 (400 Hz). This frequency is varied by the control voltage $V_c$. The frequency of the output from the coherent demodulators 268 and 270 is therefore proportional to the difference between the reference oscillator frequency and the voltage controlled oscillator frequency. Since the input voltages to the demodulators 268 and 270 are in quadrature, their outputs, after filtering in lowpass filters 274 and 276, are the quadrature related motor drive voltages $V_o \sin(wt)$ and $V_o \cos(wt)$. These drive voltages are implemented digitally by means of the system shown in FIG. 10. A reference oscillator 278 which may be a high frequency oscillator having a binary related frequency, (400 Hz multiplied by 1024, or 40,960 Hz being suitable), is provided. Two outputs A and B, the waveforms of which are illustrated in FIG. 11, are obtained from the oscillator 278. These outputs are pulse trains with a 25 percent duty factor which are shifted in time by one-half period. These delayed outputs may be implemented by suitable delay circuits such as one-shots.

One of these outputs, output A, is divided back down in frequency to 400 Hz by means of a divide-by-1024 counter 280. The resulting 400 Hz square wave is applied to a 400 Hz filter 282 to provide a 400 Hz sine wave. The filter 282 may be implemented by an operational amplifier having a feedback network which presents a maximum impedance of 40 Hz. The 400 Hz sine wave is shifted by 90° in a phase shifter 284 to provide in-phase and quadrature phase signals of 400 Hz. These sinusoidal signals are ued as reference inputs to coherent demodulators 286 and 288. These coherent demodulators are solid-state switches of the type used for the demodulator 248 (FIG. 8). The control voltage $V_c$ is applied to a bi-directional voltage controlled oscillator 290. The oscillator is illustrated in detail in FIG. 12. It provides two outputs C and D which are also illustrated in FIG. 11. These outputs are pulses having a repetition rate proportional to the magnitude of the control voltage $V_c$. The output C from the oscillator is produced only when the input voltage is positive while the other output D is produced only when the control voltage $V_c$ is negative. In other words, the outputs C and D are provided on an either/or basis. These outputs C and D and the reference pulse train A and B are applied to a frequency shift logic circuit 292 consisting of four flip-flops FF-C1, FF-C2, FF-D1 and FF-D2, a pair of AND gates A and B and an OR gate C. This frequency shift logic either increases or decreases the repetition rate at the reference pulse trains so as to provide a composite pulse train at the output of OR gate C which has a repetition rate above 40,960 Hz when the control voltage $V_c$ is negative, and lower than 40,960 Hz when the control voltage is positive.

As shown in FIG. 11, the flip-flops FF-C1 and FF-C2 are operated by the C output of the oscillator 290 so as to subtract pulses from the reference oscillator 278 output pulse train A, while the voltage controlled oscillator output D is operative to add pulses from the reference oscillator 278 output pulse train B to the reference oscillator output pulse train A, so as to provide the composite pulse train at the output of the OR gate C.

A divide-by-1024 counter divides the composite pulse train so as to provide a control pulse train which is applied to the control input of the demodulators 286 and 288. This control pulse train has a frequency equal to 400 Hz plus or minus the frequency of the bi-directional oscillator 290 divided by 1024. Since the square wave output from the counter 294, when the frequency thereof is below 400 Hz, is effectively a negative frequency, with respect to 400 Hz, the polarity of the in-phase drive voltage $V_o \sin(wt)$ will be negative when the control voltage $V_c$ is negative. Accordingly, the bi-phase sinusoidal drive voltages $\pm V_o \sin(wt)$ and $V_o \cos(wt)$ are obtained at the output of the coherent demodulators. These voltages may be applied to low pass filters for smoothing purposes and then applied to the phase windings 260 and 258 of the stepper motor 262.

The bi-directional voltage controlled oscillator 290 is shown in FIG. 12 as including an input operational amplifier 296 to which the control voltage $V_c$ is applied. A capacitor 298, connected in feedback relationship with the amplifier 296, is shunted by a field effect transistor 300. The transistor 300 is normally inhibited by a bias voltage from a source indicated at $-C$. The operational amplifier 296 and the capacitor 298 constitute a relaxation oscillator which generates a ramp having a repetition rate which is proportional to the amplitude of the control voltage $V_c$ and a polarity which corresponds to the polarity of the control voltage $V_c$. An operational amplifier 302 provides an inverter circuit which amplifies and inverts the ramp waveform. A positive ramp detector 306 and a negative ramp detector 304 are provided by comparators 310 and 308. A source of reference voltage indicated at $-T_r$ is applied to the direct inputs of these comparators 308 and 310. The inverting inputs of these comparators 306 and 308 receive outputs from the relaxation oscillator operational amplifier 296 and the inverter operational amplifier 302.

In the event that the ramp is positive going ($V_c$ going negative), the positive ramp detector 306 will provide an output when the amplitude of the ramp reaches the amplitude of the reference voltage $T_r$. On the other hand, if the ramp is negative going, the negative ramp detector 304 will provide an output when the ramp amplitude equals the reference amplitude $T_r$. Accordingly, an output pulse indicated at $+w$ is provided, as the VCO output C, (see FIG. 11) from the negative ramp detector 304 when the control voltage $V_c$ is positive, and an output pulse indicated at $-w$ representing the negative frequency is provided from the positive ramp detector 306. The latter pulse is illustrated in FIG. 11 as the VCO 290 output D.

These output pulses are also used to reset the relaxation oscillator. They are applied by way of diodes 312 and 314 to the gate of the field effect transistor 300 through which the capacitor 298 is discharged. Since the capacitor 298 is discharged when the ramp reaches certain amplitude corresponding to the reference voltage $T_r$ and increases at a rate proportional to the amplitude of the control voltage $V_c$, the repetition rate of the output pulses from the oscillator 290 is proportional to the amplitude of the control voltage.

The foregoing description of a preferred embodiment of a maritime satellite communications terminal and its tracking system has been presented in order to explain the invention. Variations and modifications thereof, within the scope of the invention, will undoubtedly present themselves to those skilled in the art. Accordingly, the foregoing description should be taken as illustrative and not in any limiting sense.

What is claimed is:

1. For maritime use on a ship or the like which is adapted to roll, pitch and change heading and having compass means providing outputs representing the heading of said ship in azimuth, a system for providing communication with an orbiting transmitting station carried by a satellite, which system comprises
   a directional antenna adapted to point in the direction of said satellite for maintaining communication therewith,
   a platform angularly movable in pitch and roll, said antenna being rotatably mounted on said platform for movement in azimuth and in elevation to be pointed in the direction of said satellite,
   means for counteracting the roll and pitch motion and movement of said platform out of level position for maintaining said platform stable,
   means responsive to said compass means outputs for generating a multi-bit digital signal representing said compass means outputs,
   heading input means responsive to data signals representing the position of said satellite in elevation and in azimuth and to said digital signal representing said compass mens outputs for providing digital azimuth control signals and elevation control signals,
   means included in said heading input means for repetitively comparing said digital signal representing said compass means outputs with said data signals representing the position of said satellite in azimuth and for repetitively providing further digital signals representing the heading of said ship with respect to said satellite, and
   means operated by said control signals for moving said antenna in the direction of said satellite.

2. The invention as set forth in claim 1 wherein said system further comprises
   automatic position update continually responsive to signals received from said satellite by said antenna for successively providing first and second digital signals representing increases and decreases in the strength of said received signal,
   means included in said heading input means and responsive to said first digital signals from said update means and operative repetitively each time said digital azimuth signals are provided for incrementing and decrementing the digital azimuth signals, and
   means included in said position updata means responsive to said digital signals for providing updata control signals for varying said elevation control signals whereby said azimuth and elevation control signals are varied to increase the strength of said received signals.

3. For use on a ship or the like, apparatus for mounting a directional antenna which is adapted to be trained to point to a satellite-born transmitting station to maintain communication therewith, said apparatus comprising
   a platform on which said antenna is rotatable mounted for movement in azimuth and in elevation,
   means mounting said platform for angular movement about at least a first axis,
   sensor means mounted on said platform for separately providing first and second outputs, said first output being a signal corresponding to the orientation of said platform about said first axis with respect to the vertical, said second output being a signal corresponding to the rate of angular movement of said platform about said first axis, a motor for rotating said platform about said first axis, and
   servo control means responsive to said first output and to said second output for respectively providing a position error signal and an angular rate error signal which predominates over said position error signal and for controlling the direction and speed of said motor therewith for maintaining said platform stable about said first axis in a plane perpendicular to the vertical thereby stabilizing said platform without the use of an inertially responsive continuously rotating body.

4. The invention as set forth in claim 3 wherein said servo control means includes means responsive to said position error signal and said rate error signal for providing a combined error signal which changes more rapidly in response to changes in said rate error signal than to changes in said position error signal.

5. The invention as set forth in claim 3 wherein said motor is a stepper motor having windings, motor drive means for providing sinusoidal alternating current signals to said windings, and means included in said motor drive means and responsive to said servo control means error signals for varying the frequency of said alternating current signals in magnitude in accordance with the magnitude of said error signals for controlling the speed of said motor and in sign in accordance with the polarity of said error signals for controlling the direction of said motor.

6. The invention as set forth in claim 3 wherein said first axis is the roll axis of said ship, said motor rotates said platform about said roll axis, and said servo control means is provided for said roll axis, and means mounting said platform for angular movement about a pitch axis perpendicular to and in the same plane as roll axis, pitch sensor means mounted on said platform for providing third and fourth outputs, said third output being a signal corresponding to the orientation of said platform about said pitch axis with respect to said vertical, said fourth output being a signal corresponding to the rate of angular movement of said platform about said pitch axis,
   a pitch motor for rotating said platform about said pitch axis, and pitch servo control means responsive to said third signal and to said fourth signal for providing a pitch position error signal and a pitch angular rate error signal and controlling the direction and speed of said pitch motor therewith for maintaining said platform stable with about said pitch axis in a plane perpendicular to said vertical thereby stabilizing said platform without the use of an inertially responsive continuously rotating body.

7. The invention as set forth in claim 6 wherein said pitch servo control means includes means responsive to said pitch position error signal and said pitch rate error signal for providing a combined error signal which changes more rapidly in response to changes in said pitch position error signal than to changes in said pitch rate error signal.

8. The invention as set forth in claim 6 wherein said pitch motor is a stepper motor having windings, pitch motor drive means for providing sinusoidal alternating current signals to said pitch motor windings, and means included in said pitch motor drive means and responsive to said pitch servo control means error signals for varying the frequency of said last named alternating current signals in magnitude in accordance with the magnitude of said last named error signals for controlling the speed of said pitch motor and in sign in accordance with the polarity of said last named error signals for controlling the direction of said pitch motor.

9. The invention as set forth in claim 8 wherein servo control means for said roll axis includes means responsive to said roll position error signal and said roll rate error signal for providing a combined roll error signal which changes more rapidly in response to changes in said roll rate error signal than to changes in said roll position error signal, said pitch servo control means includes means responsive to said pitch rate error signal and to said roll position error signal for providing a combined pitch error signal which changes more rapidly in response to changes in said pitch rate error signal than to changes in said pitch position error signal, said combined pitch error signal being applied to said pitch motor drive means, and said combined roll error signal being applied to said roll motor drive means.

10. The invention as set forth in claim 9 wherein said roll and pitch sensor means each include a separate pair of sensors, one of said pair of sensors being a solid state position sensor, the other of said pair of sensors being a solid-state rate sensor.

11. The invention as set forth in claim 10 wherein said position sensors are angular fluid sensors, said pitch sensors containing bodies of fluid angularly movable only about said pitch axis, and said roll sensors containing bodies of fluid angularly movable only about said roll axis.

12. The invention as set forth in claim 11 wherein there is separately included in said pitch and roll servo control means, a rate channel and a position channel,
said rate channel including means responsive to the output of said rate sensor for integrating said output and providing as said rate error signal, a D.C. rate error signal which varies in amplitude and polarity,
said position channel including means responsive to the output of said position sensor for providing an A.C. signal which varies in phase in accordance with the angular position of said position sensor, means for demodulating said A.C. signal and providing a D.C. position signal which varies in amplitude and polarity, means for integrating said D.C. position signal to provide said position error signal, summing means including first and second resistors respectively having said position error signal and said rate error signal applied thereto, said first resistor being of much higher resistance than said second resistor, said summing means providing said combined error signal, and means for applying said combined error signal to said motor drive means.

13. The invention as set forth in claim 12 wherein said combined error signal applying means comprises an integrating circuit and a rejection filter having a rejection frequency equal to the frequency at which said platform is mechanically resonant.

14. The invention as set forth in claim 3 wherein said apparatus further comprises means mounting said antenna on said platform for rotation in azimuth, about an axis parallel to said vertical and for rotation in elevation about an axis perpendicular to said vertical,
input means for generating control signals corresponding to orientations for said antenna in azimuth and in elevation,
an azimuth motor for rotating said antenna about said azimuth axis,
an elevation motor for rotating said antenna about said elevation axis.
servo control means responsive to said control signals for providing error signals to said motors for operating said motors until they rotate said antenna to orientations corresponding to said control signals.

15. The invention as set forth in claim 14 wherein said ship has a compass and said apparatus further comprises compass converter means for providing an output corresponding to the ship's heading, said input means including means responsive to said converter means outputs for providing said control signal for the azimuth orientation of said antenna which correspond to the difference between said heading and the orientation of said antenna in azimuth.

16. The invention as set forth in claim 15 wherein said apparatus further comprises means responsive to the signals transmitted by said satellite station and received by said antenna for providing azimuth and elevation orientation error signals corresponding to changes in the strength of said received signals, means included in said input means and responsive to said azimuth orientation error signal for varying said azimuth control signal in opposite senses depending upon the sense of the change in said azimuth orientation error signal, and means for varying said elevation control signal in response to said elevation orientation error signal.

17. The invention as set forth in claim 14 wherein said input means includes means for processing digital signals representing commands corresponding to said azimuth and elevation antenna orientations, and digital to analog converter means responsive to the digital signals processed by said input means for providing said control signals to said servo control means.

18. The invention as set forth in claim 17 wherein said input means for processing said azimuth commands includes heading input means, said ship having heading indicating means including repeater means providing a plurality of phase related voltages, converter means responsive to said plurality of voltages for providing a digital signal corresponding to the heading of said ship, said heading input means including means providing an azimuth digital signal corresponding to the difference between said azimuth orientation represented by said azimuth commands and said heading digital signal.

19. The invention as set forth in claim 18 wherein said converter means comprises means responsive to said phase related voltages for providing a corresponding plurality of phase related square waves, a source providing a plurality of reference waves each corresponding to a different one of said plurality of phase related square waves, said reference waves being related in phase corresponding to the phase relation of said reference square waves and having a repetition rate much higher than the frequency of said phase related voltages, means operated by said phase related square waves for translating said reference waves into a staircase voltage which increases and decreases in steps as the said phase related waves derived from said compass means vary in phase, a counter for storing a digital signal corresponding to the heading of said ship, and means responsive to changes in said staircase voltage in one polarity and in a polarity opposite thereto for incrementing and decrementing the count stored in said counter, respectively.

20. The invention as set forth in claim 19 wherein said means for providing said plurality of phase related voltages comprises means responsive to a reference one of said phase related voltages for providing sampling pulses when said reference voltage is of one polarity, means operated by said sampling pulses for sampling each of the other of said phase related voltages, and filtering means responsive to each of said phase related voltage for providing said phase related square waves.

21. The invention as set forth in claim 18 including separate isolator means responsive to each of said phase related voltages from said repeater means, each of said isolator means including rectifier means for providing outputs when the one of said phase related voltages applied thereto is of one polarity, an isolation resistor for applying said phase related voltage to said rectifier means, and an electro-optical isolator input connected to said rectifier means for providing a pulse train corresponding to said rectified phase related voltage.

22. The invention as set forth in claim 19 wherein said translating means includes a summing network, mixer means operated by said phase related square waves and connected to said summing network for selectively applying said reference waves to said summing network, a phase detector connected to said source of reference square waves for receiving one of said reference waves and being also connected to said summing circuit, and a staircase generator connected to said phase detector.

23. The invention as set forth in claim 22 wherein said mixer is a switching circuit, said summing circuit includes a plurality of resistors separately connected to a switch output of said mixer, said reference waves from said source each being connected to a different switch input of said mixer, said phase related square waves each being connected to a different control input of said mixer, the reference waves and the phase related square waves which have corresponding phase relationship being connected to corresponding switch and control inputs of said mixer, said phase detector being a flip-flop, and circuit means for detecting transitions of like polarity being connected between the set and reset inputs of said flip-flop and said mixer output and the output of said source which provides one of said reference waves.

24. The invention as set forth in claim 18 wherein said antenna is rotatable in azimuth between a pair of limits which are less than 360° apart, and wherein said heading input means comprises a counter, means for inputting said counter with a count corresponding to said azimuth digital signal, means for detecting when said count represents a bearing greater than or less than said limits, and means operated by said detecting means for inputting said counter with a plurality of digital signals corresponding to 360°,, and means for outputting the digital signal stored in said counter to said digital to analog converter to generate said azimuth control signal.

25. The invention as set forth in claim 24 further comprising means for automatically updating the position of said antenna in azimuth which comprises means for generating pulses at a rate corresponding to the strength of the signal transmitted from said satellite station and received by said antenna, means for counting the number of said pulses generated during predetermined first periods of time which occur after successive second periods of time, means operative when said count accumulated during a first occurring of a consecutive pair of said successive second periods of time exceeds the count accumulated during a second occurring of said consecutive pair of second periods of time for incrementing said counter by a certain number of counts, and means operative when the count accumulated during said second occurring second periods of time exceeds the count accumulated during said first occurring second periods of time for decrementing said counter by said certain number of counts.

26. The invention as set forth in claim 2 wherein said means which provide said azimuth digital signals includes a bidirectional counter which reaches a count in response to the comparison of said compass means digital signals and in response to said first digital signals which count represents said azimuth digital signals, and means also included in said heading input means and responsive to said azimuth digital signals stored in said counter for providing an output when said stored azimuth digital signal corresponds to the rotation of said antenna in azimuth beyond a given limit in one sense of rotation, and means responsive to said last named output for applying pulses to said counter in a sense to offset the count therein by a number of such pulses corresponding to 360° azimuth in the sense of rotation opposite to said one sense.

* * * * *